United States Patent
Yang et al.

(10) Patent No.: US 9,943,192 B2
(45) Date of Patent: Apr. 17, 2018

(54) SHELVING SYSTEM WITH OBSCURABLE SHELVING

(71) Applicant: simplehuman, LLC, Torrance, CA (US)

(72) Inventors: Frank Yang, Rancho Palos Verdes, CA (US); Joseph Sandor, Newport Beach, CA (US); Zachary Rapoport, Northridge, CA (US)

(73) Assignee: simplehuman, LLC, Torrance, CA (US)

( * ) Notice: Subject to any disclaimer, the term of this patent is extended or adjusted under 35 U.S.C. 154(b) by 0 days.

(21) Appl. No.: 15/060,057

(22) Filed: Mar. 3, 2016

(65) Prior Publication Data
US 2016/0183737 A1 Jun. 30, 2016

Related U.S. Application Data

(63) Continuation-in-part of application No. 14/638,940, filed on Mar. 4, 2015, now Pat. No. 9,339,151.

(60) Provisional application No. 61/953,171, filed on Mar. 14, 2014.

(51) Int. Cl.
*A47K 3/28* (2006.01)
*F16B 7/10* (2006.01)

(52) U.S. Cl.
CPC .............. *A47K 3/281* (2013.01); *F16B 7/105* (2013.01); *Y10T 29/49826* (2015.01)

(58) Field of Classification Search
CPC ......... A47F 5/0087; A47F 5/08; A47K 3/281; F16B 7/105; Y10T 29/49826
USPC .................................................. 211/119.009
See application file for complete search history.

(56) References Cited

U.S. PATENT DOCUMENTS

| 141,186 A | 7/1873 | Thomas |
| 163,852 A | 6/1875 | Denman |
| 181,593 A | 8/1876 | Randall |
| 284,090 A | 8/1883 | Tingle |

(Continued)

FOREIGN PATENT DOCUMENTS

| DE | 29600613 U1 | 3/1996 |
| EP | 0 717 947 A2 | 6/1996 |

(Continued)

OTHER PUBLICATIONS

Shower Shelf—Anodized Aluminum, Simplehuman SKU# BT1097, available as early as Dec. 23, 2015 on the internet at www.simplehuman.com (see http://www.simplehuman.com/shower-shelf-anodized-aluminum).

(Continued)

*Primary Examiner* — Ko H Chan
(74) *Attorney, Agent, or Firm* — Knobbe, Martens, Olson & Bear, LLP

(57) ABSTRACT

Various shelving systems, such as shower caddies, are disclosed. In some embodiments, a shower caddy includes an elongate support member and a plurality of shelves, each of which can be supported by a clamping mechanism. The support member can have a telescoping configuration so that upper and lower ends of the support member can be pressed against upper and lower stationary objects. The shelving system can include a shroud configured to conceal, block, or surround a portion of a shelf in a closed position and allow access to the portion of the shelf in the open position.

33 Claims, 20 Drawing Sheets

(56) References Cited

U.S. PATENT DOCUMENTS

| | | | |
|---|---|---|---|
| 387,758 A | 8/1888 | Barnhart | |
| 397,558 A | 2/1889 | Lumley | |
| 434,708 A | 8/1890 | Grier | |
| 475,020 A | 5/1892 | Perry | |
| 477,291 A | 6/1892 | Bomar | |
| 496,961 A | 5/1893 | Trude | |
| 527,273 A | 10/1894 | Fowler | |
| 536,272 A | 3/1895 | Edsall | |
| 543,935 A | 8/1895 | Hostler | |
| 612,061 A | 10/1898 | Shambaugh | |
| 613,231 A | 11/1898 | Bennett | |
| 618,425 A | 1/1899 | Manger | |
| 626,739 A | 6/1899 | Vanderman | |
| 644,080 A | 2/1900 | Huebel | |
| 661,755 A | 11/1900 | Thurstensen | |
| 799,233 A * | 9/1905 | Hubbell | A47B 49/004 108/105 |
| 839,339 A | 12/1906 | Tuttle | |
| 841,866 A | 1/1907 | Hollis | |
| 845,917 A | 3/1907 | Worley | |
| 913,955 A | 3/1909 | Hansen | |
| 970,485 A | 9/1910 | Frey | |
| 1,026,149 A | 5/1912 | Crane | |
| 1,071,428 A | 8/1913 | Jones | |
| 1,254,094 A | 1/1918 | Vogt | |
| 1,446,036 A | 2/1923 | Willaim | |
| 1,478,339 A | 12/1923 | Wade | |
| 1,511,704 A | 10/1924 | Buck | |
| 1,554,137 A | 9/1925 | Slifkin | |
| 1,582,762 A | 4/1926 | Klock | |
| 1,639,551 A | 8/1927 | Booth | |
| 1,931,321 A | 10/1933 | Keil | |
| 2,012,452 A | 8/1935 | Littell | |
| 2,042,517 A | 6/1936 | Ellis | |
| 2,155,097 A | 4/1939 | Mendle | |
| 2,157,309 A | 5/1939 | Swedman et al. | |
| 2,199,851 A | 5/1940 | Freeman | |
| 2,254,770 A | 9/1941 | Bitney | |
| 2,513,889 A | 7/1950 | Nilsson | |
| 2,593,738 A | 4/1952 | Dollahlte | |
| 2,675,782 A | 4/1954 | Lage et al. | |
| 2,677,519 A | 5/1954 | Hobson | |
| 2,693,751 A | 11/1954 | Allen | |
| 2,746,661 A | 5/1956 | Kaplan | |
| 2,788,902 A | 4/1957 | Nowicki | |
| 2,837,219 A | 6/1958 | Ferdinand et al. | |
| 2,868,386 A | 1/1959 | Seyforth | |
| 2,919,873 A | 1/1960 | Tice | |
| 2,923,415 A | 2/1960 | Brown | |
| 2,923,428 A | 2/1960 | Averill | |
| 2,928,512 A | 3/1960 | Slater et al. | |
| 2,932,873 A | 4/1960 | Reichert | |
| 2,936,146 A | 5/1960 | Wunder | |
| 2,937,766 A | 5/1960 | Penn | |
| 2,941,669 A | 6/1960 | Palay et al. | |
| D188,332 S | 7/1960 | Salen | |
| D189,722 S | 2/1961 | Wolf | |
| 2,976,003 A | 3/1961 | Foster | |
| 2,977,953 A | 4/1961 | Dowdy | |
| 3,035,708 A | 5/1962 | Freeman | |
| 3,043,440 A | 7/1962 | Berlin | |
| 3,059,374 A | 10/1962 | Bernay | |
| 3,088,598 A | 5/1963 | Werneke | |
| D195,412 S | 6/1963 | Vernik | |
| 3,111,723 A | 11/1963 | Bates | |
| 3,115,107 A | 12/1963 | Glenny | |
| 3,119,496 A | 1/1964 | Burk | |
| 3,124,253 A | 3/1964 | Pelrich et al. | |
| 3,132,609 A | 5/1964 | Chesley | |
| 3,134,474 A | 5/1964 | Marchman | |
| 3,138,260 A | 6/1964 | Tedrick | |
| 3,181,923 A | 5/1965 | Guillon et al. | |
| 3,239,182 A | 3/1966 | Blanz | |
| 3,266,764 A | 8/1966 | Briles | |
| 3,307,710 A | 3/1967 | Negri | |
| 3,319,983 A | 5/1967 | Zibell | |
| 3,323,851 A | 6/1967 | Duboff | |
| 3,343,685 A | 9/1967 | Giambalvo | |
| 3,471,031 A | 10/1969 | Coplan | |
| 3,533,583 A | 10/1970 | Azim | |
| 3,593,857 A | 7/1971 | Hernes | |
| D222,276 S | 10/1971 | Hughes | |
| 3,641,922 A | 2/1972 | Nachazel et al. | |
| 3,661,121 A | 5/1972 | Zielin | |
| 3,695,455 A | 10/1972 | Larson | |
| 3,710,096 A | 1/1973 | McFarlin | |
| 3,734,439 A | 5/1973 | Wintz | |
| 3,787,078 A | 1/1974 | Williams | |
| 3,789,996 A | 2/1974 | Stroh | |
| 3,791,091 A | 2/1974 | Albrizzi | |
| 3,807,574 A | 4/1974 | Lanza | |
| 3,854,686 A | 12/1974 | Konstant | |
| 3,894,707 A | 7/1975 | Heard | |
| 3,907,119 A | 9/1975 | Franz | |
| 3,923,162 A | 12/1975 | Hussey | |
| D239,579 S | 4/1976 | Taub | |
| 3,954,182 A | 5/1976 | McEvers | |
| 3,983,823 A | 10/1976 | McDonnell | |
| 3,998,334 A | 12/1976 | Smith | |
| 4,018,019 A | 4/1977 | Raith et al. | |
| 4,033,539 A | 7/1977 | Bardocz | |
| 4,059,915 A | 11/1977 | Owens | |
| 4,096,951 A | 6/1978 | Menssen | |
| 4,106,736 A | 8/1978 | Becker, III et al. | |
| D250,560 S | 12/1978 | Gordon | |
| 4,154,356 A | 5/1979 | Schieve | |
| 4,192,426 A | 3/1980 | Gauthier | |
| 4,215,840 A | 8/1980 | Babberl | |
| 4,232,790 A | 11/1980 | Serrano | |
| 4,274,400 A | 6/1981 | Baus | |
| 4,310,193 A | 1/1982 | Kolleas | |
| 4,360,283 A | 11/1982 | Psotta | |
| 4,387,811 A | 6/1983 | Ragir et al. | |
| 4,415,091 A | 11/1983 | Wolff | |
| 4,415,211 A | 11/1983 | Alissandratos | |
| 4,428,488 A | 1/1984 | McAvinn et al. | |
| 4,437,450 A | 3/1984 | Connelly | |
| D273,645 S | 5/1984 | McEvers | |
| D274,201 S | 6/1984 | Aaron | |
| 4,511,047 A | 4/1985 | Elinsky | |
| 4,541,131 A | 9/1985 | Sussman | |
| 4,559,879 A | 12/1985 | Hausser | |
| D286,599 S | 11/1986 | Sussman | |
| D289,353 S | 4/1987 | Davis et al. | |
| 4,664,428 A | 5/1987 | Bridges | |
| D293,183 S | 12/1987 | Aaron | |
| 4,761,092 A | 8/1988 | Nakatani | |
| 4,771,897 A | 9/1988 | Ho | |
| 4,771,899 A | 9/1988 | Benedict et al. | |
| 4,776,471 A | 10/1988 | Elkins | |
| 4,786,022 A | 11/1988 | Grieshaber | |
| 4,805,784 A | 2/1989 | Solheim et al. | |
| 4,860,909 A | 8/1989 | Leuml | |
| 4,865,283 A | 9/1989 | Parker | |
| 4,869,378 A | 9/1989 | Miller | |
| 4,869,379 A | 9/1989 | Hawkrige | |
| 4,875,593 A * | 10/1989 | Trimble | A47K 3/281 211/115 |
| 4,883,399 A | 11/1989 | MacLean | |
| 4,895,331 A | 1/1990 | Nehls | |
| 4,909,467 A | 3/1990 | Shan-Pao | |
| D314,294 S | 2/1991 | Axhamre | |
| 4,998,647 A | 3/1991 | Sharp | |
| D315,840 S | 4/1991 | Emery | |
| 5,014,860 A | 5/1991 | Emery | |
| 5,023,755 A | 6/1991 | Rosenberg | |
| 5,083,670 A | 1/1992 | Zimmer | |
| D327,187 S | 6/1992 | Swon | |
| 5,127,528 A | 7/1992 | Cone | |
| 5,160,101 A | 11/1992 | Ferraro et al. | |
| 5,165,644 A | 11/1992 | Allen | |
| 5,180,067 A | 1/1993 | Conaway et al. | |
| 5,190,170 A | 3/1993 | Steiner | |
| 5,192,427 A | 3/1993 | Eger et al. | |

(56) References Cited

U.S. PATENT DOCUMENTS

| | | |
|---|---|---|
| 5,197,614 A | 3/1993 | Dalton et al. |
| D340,604 S | 10/1993 | Conaway et al. |
| 5,255,401 A | 10/1993 | Sambrookes et al. |
| 5,284,260 A | 2/1994 | Caligiuri, Sr. |
| 5,307,797 A | 5/1994 | Kleefeld |
| 5,318,175 A | 6/1994 | Stevens |
| D351,750 S | 10/1994 | Sweeney |
| D351,751 S | 10/1994 | Brightbill et al. |
| 5,355,867 A | 10/1994 | Hall et al. |
| 5,429,252 A | 7/1995 | Liu |
| 5,462,178 A | 10/1995 | Wallach et al. |
| 5,483,761 A | 1/1996 | Simpson |
| 5,505,318 A | 4/1996 | Goff |
| 5,505,319 A * | 4/1996 | Todd, Jr. .............. A47F 5/04 211/163 |
| D370,809 S | 6/1996 | Munoz et al. |
| D370,810 S | 6/1996 | Munoz |
| D371,031 S | 6/1996 | Munoz et al. |
| 5,524,772 A | 6/1996 | Simmons |
| 5,527,273 A | 6/1996 | Manna et al. |
| D376,941 S | 12/1996 | Munoz et al. |
| 5,588,543 A | 12/1996 | Finger |
| D377,286 S | 1/1997 | Munoz |
| D378,556 S | 3/1997 | Munoz |
| 5,620,105 A | 4/1997 | Macek |
| 5,632,049 A | 5/1997 | Chen |
| D382,733 S | 8/1997 | Goetz |
| 5,666,940 A | 9/1997 | Kreiter |
| D387,595 S | 12/1997 | Whang |
| 5,692,817 A | 12/1997 | Jun et al. |
| 5,697,508 A | 12/1997 | Rifkin et al. |
| 5,702,010 A | 12/1997 | Liang |
| D388,642 S | 1/1998 | Winter |
| 5,735,413 A | 4/1998 | Allen |
| 5,772,048 A | 6/1998 | Sopcisak |
| 5,772,050 A | 6/1998 | Shih |
| D395,773 S | 7/1998 | Hofman |
| D396,379 S | 7/1998 | Stoetzl |
| D396,585 S | 8/1998 | Hofman |
| D397,567 S | 9/1998 | Hofman |
| D400,745 S | 11/1998 | France |
| 5,833,192 A | 11/1998 | Buhrman |
| D402,145 S | 12/1998 | Hofman et al. |
| 5,855,184 A | 1/1999 | Eichler et al. |
| 5,855,286 A | 1/1999 | Zaid |
| 5,897,002 A | 4/1999 | Carlino |
| D409,424 S | 5/1999 | Hofman et al. |
| 5,899,423 A | 5/1999 | Albertini |
| 5,934,636 A | 8/1999 | Cyrell |
| 5,941,397 A | 8/1999 | Buchanan et al. |
| 5,944,896 A | 8/1999 | Landesman et al. |
| 5,984,114 A | 11/1999 | Frankel |
| D417,991 S | 12/1999 | Hofman et al. |
| D419,020 S | 1/2000 | Emery et al. |
| 6,017,009 A | 1/2000 | Swartz et al. |
| D421,692 S | 3/2000 | Wojtowicz et al. |
| D421,867 S | 3/2000 | Carville et al. |
| 6,050,426 A | 4/2000 | Leurdijk |
| D424,355 S | 5/2000 | Barton |
| 6,065,618 A | 5/2000 | Stetler |
| D427,469 S | 7/2000 | Thurston-Chartraw et al. |
| D429,091 S | 8/2000 | Chen |
| D429,934 S | 8/2000 | Hofman |
| 6,113,042 A | 9/2000 | Welsch et al. |
| 6,119,878 A | 9/2000 | Zen |
| 6,123,303 A | 9/2000 | Huang |
| 6,135,668 A | 10/2000 | Lin |
| 6,152,312 A | 11/2000 | Nava et al. |
| 6,206,206 B1 | 3/2001 | Saylor et al. |
| 6,233,877 B1 | 5/2001 | Monroe |
| D443,162 S | 7/2001 | Winter |
| D444,333 S | 7/2001 | Ferrer Beltran |
| D446,670 S | 8/2001 | Emery et al. |
| 6,302,036 B1 | 10/2001 | Carson et al. |
| 6,302,280 B1 | 10/2001 | Bermes |
| 6,311,856 B2 | 11/2001 | Battaglia et al. |
| 6,318,572 B1 | 11/2001 | Lai |
| 6,347,777 B1 | 2/2002 | Webber et al. |
| 6,378,709 B1 | 4/2002 | Stuart |
| 6,394,404 B1 | 5/2002 | Cyrell |
| 6,409,029 B1 | 6/2002 | Bermes |
| D462,552 S | 9/2002 | Emery et al. |
| 6,481,586 B1 | 11/2002 | Hoff |
| 6,494,327 B2 | 12/2002 | Huang |
| 6,502,794 B1 | 1/2003 | Ting |
| D470,703 S | 2/2003 | Hoernig |
| 6,520,351 B1 | 2/2003 | Zadro |
| 6,527,473 B2 | 3/2003 | Chen |
| D472,750 S | 4/2003 | Clucas |
| D473,084 S | 4/2003 | Suero, Jr. |
| D473,411 S | 4/2003 | Walker |
| 6,540,430 B2 | 4/2003 | Hsu |
| 6,550,739 B1 | 4/2003 | Brindisi |
| 6,551,226 B1 | 4/2003 | Webber et al. |
| D475,560 S | 6/2003 | Suero, Jr. |
| D475,561 S | 6/2003 | Suero, Jr. |
| 6,575,315 B2 | 6/2003 | Zidek |
| 6,581,790 B1 | 6/2003 | Zadro |
| 6,591,996 B1 | 7/2003 | Wu |
| D477,947 S | 8/2003 | Snell |
| D479,073 S | 9/2003 | Snell |
| D479,074 S | 9/2003 | Snell |
| 6,619,164 B1 | 9/2003 | Ricci et al. |
| 6,648,152 B2 | 11/2003 | Bermes |
| D483,251 S | 12/2003 | Suero, Jr. |
| D485,462 S | 1/2004 | Suero, Jr. |
| 6,688,238 B1 | 2/2004 | Alexiou |
| 6,726,034 B2 | 4/2004 | Holbrook et al. |
| D489,207 S | 5/2004 | Rosen |
| D492,188 S | 6/2004 | Goldberg |
| 6,758,355 B2 | 7/2004 | Zidek |
| D493,991 S | 8/2004 | Dretzka |
| D495,549 S | 9/2004 | Yu et al. |
| D496,549 S | 9/2004 | Snell |
| D498,102 S | 11/2004 | Snell |
| 6,824,000 B2 | 11/2004 | Samelson |
| 6,824,225 B2 | 11/2004 | Stiffler |
| 6,848,144 B1 | 2/2005 | McDonald |
| 6,871,748 B2 | 3/2005 | Suttles |
| 6,918,498 B2 | 7/2005 | Sparkowski |
| D509,361 S | 9/2005 | Suero, Jr. |
| 6,957,794 B2 | 10/2005 | Landreville et al. |
| D512,861 S | 12/2005 | Rosen |
| 6,983,853 B1 | 1/2006 | Fickett |
| D516,901 S | 3/2006 | Murray |
| 7,021,814 B2 | 4/2006 | Berardi |
| 7,059,271 B2 | 6/2006 | Santa Cruz et al. |
| 7,086,633 B2 | 8/2006 | Welch et al. |
| D530,551 S | 10/2006 | Snell |
| D533,283 S | 12/2006 | Holztrager |
| D534,062 S | 12/2006 | van den Bosch |
| 7,152,488 B2 | 12/2006 | Hedrich et al. |
| 7,195,213 B2 | 3/2007 | Weatherly |
| D543,747 S | 6/2007 | Harwanko |
| D544,786 S | 6/2007 | Barrese |
| 7,229,059 B1 | 6/2007 | Hood |
| D546,879 S | 7/2007 | Qiu |
| 7,246,711 B1 | 7/2007 | Metcalf |
| 7,255,312 B2 * | 8/2007 | Melic .............. E04G 21/3233 248/125.1 |
| D552,391 S | 10/2007 | Rosen |
| D552,392 S | 10/2007 | Rosen |
| D552,393 S | 10/2007 | Rosen |
| 7,275,647 B1 | 10/2007 | Thompson |
| D557,050 S | 12/2007 | Dretzka |
| 7,316,376 B1 | 1/2008 | Engler |
| D562,608 S | 2/2008 | Kramer |
| D562,609 S | 2/2008 | Kramer |
| D564,257 S | 3/2008 | Yang et al. |
| 7,347,197 B2 | 3/2008 | Hankinson |
| D566,991 S | 4/2008 | Harwanko |
| D568,657 S | 5/2008 | Snider |
| D568,658 S | 5/2008 | Yang et al. |
| D569,148 S | 5/2008 | Yang et al. |

(56) References Cited

U.S. PATENT DOCUMENTS

| | | |
|---|---|---|
| D569,149 S | 5/2008 | Walker |
| D572,060 S | 7/2008 | Snider |
| D572,502 S | 7/2008 | Yang et al. |
| D572,516 S | 7/2008 | Snider |
| D573,386 S | 7/2008 | Clucas |
| D573,387 S | 7/2008 | Walker |
| D573,822 S | 7/2008 | Yang et al. |
| 7,398,790 B2 | 7/2008 | Glatz |
| 7,401,754 B2 | 7/2008 | Welch et al. |
| D574,649 S | 8/2008 | Snider |
| D574,650 S | 8/2008 | Snider |
| D575,087 S | 8/2008 | Ghiorghie |
| 7,407,060 B2 | 8/2008 | Swartz et al. |
| D578,815 S | 10/2008 | Dominique et al. |
| D579,254 S | 10/2008 | Dominique et al. |
| D587,504 S | 3/2009 | Russell et al. |
| D589,728 S | 4/2009 | Shaha et al. |
| D598,688 S | 8/2009 | Yang et al. |
| 7,591,385 B2 | 9/2009 | Brooks |
| D615,333 S | 5/2010 | Snell |
| D616,235 S | 5/2010 | Guindi |
| D617,128 S | 6/2010 | Guindi |
| D622,990 S | 9/2010 | Yang et al. |
| D627,969 S | 11/2010 | Klein et al. |
| D628,385 S | 12/2010 | Klein et al. |
| D628,841 S | 12/2010 | Yang et al. |
| D632,081 S | 2/2011 | Klein et al. |
| D632,514 S | 2/2011 | Didehvar et al. |
| D635,807 S | 4/2011 | Lindo |
| D640,488 S | 6/2011 | Didehvar et al. |
| D641,191 S | 7/2011 | Walker |
| D641,193 S | 7/2011 | Vaccaro |
| 7,975,653 B2 | 7/2011 | Cash |
| D644,050 S | 8/2011 | Cittadino |
| D651,837 S | 1/2012 | Yang et al. |
| D651,838 S | 1/2012 | Yang et al. |
| 8,225,946 B2 | 7/2012 | Yang et al. |
| D670,520 S | 11/2012 | Gilbert |
| D676,696 S | 2/2013 | Primeau |
| D677,956 S | 3/2013 | Tawil |
| D677,957 S | 3/2013 | Tawil |
| 8,408,405 B2 | 4/2013 | Yang et al. |
| D683,165 S | 5/2013 | Yang et al. |
| 8,474,632 B2 | 7/2013 | Yang et al. |
| D694,548 S | 12/2013 | Snell |
| D698,575 S | 2/2014 | Tawil |
| D699,478 S | 2/2014 | Snider |
| 8,763,821 B2 | 7/2014 | Yang et al. |
| 8,845,045 B2 * | 9/2014 | Stubblefield .......... A47F 3/0426 16/299 |
| 8,950,599 B2 | 2/2015 | Wilder |
| D726,441 S | 4/2015 | Yang et al. |
| D727,060 S | 4/2015 | Yang et al. |
| D734,956 S | 7/2015 | Yang et al. |
| D753,411 S | 4/2016 | Yang et al. |
| 9,339,151 B2 | 5/2016 | Yang et al. |
| D769,641 S | 10/2016 | Yang et al. |
| D770,197 S | 11/2016 | Yang et al. |
| D770,198 S | 11/2016 | Yang et al. |
| 2001/0004064 A1 | 6/2001 | Battaglia et al. |
| 2002/0158033 A1 | 10/2002 | Chen |
| 2002/0172549 A1 | 11/2002 | Koros et al. |
| 2003/0000905 A1 | 1/2003 | Zidek |
| 2003/0132181 A1 | 7/2003 | Saulnier-Matteini |
| 2003/0136782 A1 | 7/2003 | Dicello et al. |
| 2003/0222191 A1 | 12/2003 | Tsai |
| 2004/0188369 A1 | 9/2004 | Yu |
| 2004/0188577 A1 | 9/2004 | Gaderick |
| 2005/0040301 A1 | 2/2005 | Walter |
| 2005/0139562 A1 | 6/2005 | Chen |
| 2005/0205509 A1 | 9/2005 | Flynn |
| 2005/0205722 A1 | 9/2005 | Krueger |
| 2006/0038097 A1 | 2/2006 | Diller |
| 2006/0124812 A1 | 6/2006 | Berardi |
| 2006/0130381 A1 | 6/2006 | Caterinacci |
| 2006/0180561 A1 | 8/2006 | Wisnoski et al. |
| 2006/0261022 A1 | 11/2006 | Sampaio |
| 2007/0045208 A1 | 3/2007 | Quan |
| 2007/0194191 A1 | 8/2007 | Persson |
| 2007/0235611 A1 | 10/2007 | Riblet |
| 2007/0295681 A1 | 12/2007 | Colin |
| 2008/0053935 A1 | 3/2008 | Newbouild et al. |
| 2008/0142669 A1 | 6/2008 | Zlotocha |
| 2009/0134290 A1 | 5/2009 | Begic et al. |
| 2009/0188880 A1 | 7/2009 | Yang et al. |
| 2010/0000449 A1 | 1/2010 | Botkin |
| 2012/0091088 A1 | 4/2012 | Didehvar et al. |
| 2013/0313212 A1* | 11/2013 | Lindo ................. A47K 3/281 211/119.011 |
| 2014/0319083 A1 | 10/2014 | Stark |
| 2015/0257533 A1 | 9/2015 | Yang et al. |
| 2015/0257534 A1 | 9/2015 | Yang et al. |
| 2016/0120303 A1 | 5/2016 | Constantino et al. |

FOREIGN PATENT DOCUMENTS

| | | |
|---|---|---|
| FR | 2549361 | 1/1985 |
| JP | D1136196 | 1/2002 |
| KR | 3020030000821 | 3/2003 |
| WO | WO 2013/005462 A1 | 1/2013 |
| WO | WO 2015/138257 A1 | 9/2015 |

OTHER PUBLICATIONS

Adjustable Shower Caddy Plus—Stainless Steel + Anodized Aluminum, Simplehuman SKU# BT1099, available as early as Nov. 1, 2015 on the internet at www.simplehuman.com (see http://www.simplehuman.com/adjustable-shower-caddy-plus-stainless-steel-anodized-aluminum).

Adjustable Shower Caddy—Stainless Steel + Anodized Aluminum, Simplehuman SKU# BT1098, available as early as Mar. 17, 2015 on the internet at www.simplehuman.com (see http://www.simplehuman.com/adjustable-shower-caddy-stainless-steel-anodized-aluminum2).

U.S. Appl. No. 11/477,755, U.S. Pat. No. 8,255,946.
U.S. Appl. No. 13/149,717, U.S. Pat. No. 8,408,405.
U.S. Appl. No. 12/628,453, U.S. Pat. No. 8,474,632.
U.S. Appl. No. 13/801,499, U.S. Pat. No. 8,763,821.
U.S. Appl. No. 29/264,788, U.S. Pat. No. D. 564,257.
U.S. Appl. No. 29/292,217, U.S. Pat. No. D. 568,658.
U.S. Appl. No. 29/276,705, U.S. Pat. No. D. 569,148.
U.S. Appl. No. 29/277,828, U.S. Pat. No. D. 572,502.
U.S. Appl. No. 29/289,265, U.S. Pat. No. D. 573,822.
U.S. Appl. No. 29/310,233, U.S. Pat. No. D. 598,688.
U.S. Appl. No. 29/334,143, U.S. Pat. No. D. 622,990.
U.S. Appl. No. 29/351,158, U.S. Pat. No. D. 628,841.
U.S. Appl. No. 29/357,567, U.S. Pat. No. D. 651,837.
U.S. Appl. No. 29/409,435, U.S. Pat. No. D. 657,838.
U.S. Appl. No. 29/413,132, U.S. Pat. No. D. 683,165.
U.S. Appl. No. 29/484,743, U.S. Pat. No. D. 726,441.
U.S. Appl. No. 29/484,765, U.S. Pat. No. D. 727,060.
U.S. Appl. No. 29/484,885, U.S. Pat. No. D. 734,956.
U.S. Appl. No. 12/021,154, 2009/0188880.
U.S. Appl. No. 14/634,408, 2015/0257533.
U.S. Appl. No. 14/638,940, 2015/0257534.
U.S. Appl. No. 29/518,332.
U.S. Appl. No. 29/518,327.
U.S. Appl. No. 29/518,582.
International Preliminary Report on Patentability for International Patent Application No. PCT/US2015/019282, dated Sep. 22, 2016, in 10 pages.
U.S. Appl. No. 29/594,906, filed Feb. 23, 2017, Yang et al.
U.S. Appl. No. 29/518,332, filed Feb. 23, 2015, Yang et al.
U.S. Appl. No. 29/518,327, filed Feb. 23, 2015, Yang et al.
U.S. Appl. No. 29/518,582, filed Feb. 25, 2015, Yang et al.
Magnite—The Magnetic Shower Caddy by Max Hunt, Coroflot product webpage; apparently available Aug. 10, 2012, retrieved on

(56) References Cited

OTHER PUBLICATIONS

Feb. 17, 2015 from internet, http://www.coroflot.com/theha/Magnite-The-Magnetic-Shower-Caddy.
White Adjustable Shower Caddy, Simplehuman SKU# BT1015, apparently available Dec. 14, 2007 on the internet at www.simplehuman.com (see http://web.archive.org/web/20071221125437/www.simplehuman.com/products/bathroom-organization/white-shower-caddy.html).
International Search Report and Written Opinion for International Patent Application No. PCT/US2015/019282, dated Jun. 8, 2015, in 13 pages.

\* cited by examiner

SHELVING SYSTEM WITH OBSCURABLE SHELVING

CROSS-REFERENCE

This application is a continuation-in-part of U.S. patent application Ser. No. 14/638,940, filed Mar. 4, 2015, which claims the priority benefit under 35 U.S.C. § 119(e) of U.S. Provisional Application No. 61/953,171, filed Mar. 14, 2014, the entirety of each of which is hereby incorporated by reference. This application also incorporates by reference the entirety of U.S. Design patent application Ser. No. 29/484,885, filed Mar. 13, 2014, now U.S. Pat. No. D734,956, and U.S. Design patent application Ser. No. 29/534,240, filed Jul. 27, 2015.

BACKGROUND

Field

The present disclosure is related generally to devices that can be used for organizing personal articles, and specifically to shelving systems.

Description of the Related Art

Certain shelving devices, such as those commonly known as "shower caddies," are used in a shower or bath enclosure to store and organize personal care articles, such as shampoo, soap, razors, toothbrushes, bath sponges, etc. Shower caddies typically include shelves or baskets for holding the personal care items. The collection of personal care articles on the shelving can sometimes appear cluttered or disorganized.

SUMMARY

Some shelving systems have a movable visually obscuring element, such as a shroud. The obscuring element can aid in concealing or covering one or more shelves and/or products carried by the shelves on the shelving system. This can enable a user to selectively hide the product on the shelves (e.g., for privacy and/or aesthetic reasons) and to selectively reveal the products (e.g., to allow access for use of the products).

In some embodiments, a shelving system includes an elongate support member with a first end and a second end, and a longitudinal axis extending between the first and second ends. The system can include one or more shelf members for holding bathroom toiletries. The shelf member can be connected to the elongate support member with a connection mechanism. The shelving system can include a shroud member adapted to be rotatable between a first position corresponding to a closed position and a second position corresponding to an open position. The shroud member can be configured to generally surround a first portion of the shelf member in the closed position and can be configured to allow access to the first portion of the shelf member in the open position.

Various embodiments of the shelving system can include any one, or any combination, of any of the following. In some embodiments, the shroud member includes a semi-cylindrical plate configured to surround at least a quarter of an outer perimeter of the shelf member in the closed position. In some embodiments, the shroud member includes a semi-cylindrical plate configured to surround at least a third of an outer perimeter of the shelf member in the closed position. In some embodiments, the shroud member includes a semi-cylindrical plate configured to surround at least half of an outer perimeter of the shelf member in the closed position. In some embodiments, the shroud member includes a semi-cylindrical plate configured to surround at least half of an outer perimeter of two shelf members of the one or more shelf members in the closed position. In some embodiments, the shroud member includes a bearing assembly for assisting rotation of the shroud member about the elongate support member between the closed and open positions.

Certain embodiments of the shelving system can include any one, or any combination, of any of the following. In some embodiments, the connection mechanism slidably connects the shelf member to the elongate support member, the connection mechanism including a user-actuatable clamping device configured to allow the shelf member to be adjusted vertically between one or more positions along the elongate support member in a direction generally parallel to the longitudinal axis of the elongate support member. In some embodiments, the user-actuatable clamping device includes a clamp body, clamp plate, and clamp lever, the clamping device configured to move between locked and unlocked positions, in which a position of the shelf member can be adjusted when the single user-actuatable device is in the unlocked position, and wherein the shelf member can be locked in place when the single user-actuatable device is in the locked position. In some embodiments, the connection mechanism slidably and rotatably connects the shelf member to the elongate support member, the clamping device configured to allow the shelf member to be adjusted about at least two degrees of freedom relative to the elongate support member.

Some embodiments of the shelving system can include any one, or any combination, of any of the following. In some embodiments, the elongate support member includes a circular shaped cross-section. In some embodiments, the first end of the elongate support member includes an upper foot member configured to provide traction when the first end of the elongate support member is pressed against a first surface of the bathroom, and the second end of the elongate support member includes a lower foot member configured to provide traction when the second end of the elongate support member is pressed against a second surface of the bathroom, the upper and lower foot members comprised of rubber or a rubber-like material, silicone-based material, or other resilient or flexible material. In some embodiments, the shelf member includes an opening for holding a bottle of toiletries upside down. In some embodiments, the shelf member includes a circular cross-section.

In some embodiments, a shelving system is provided that includes a first elongate support member, a second elongate support member, first and second arm members adapted to couple the first elongate support member to the second elongate support member such that the first elongate support member can be moved along the second elongate support member in a direction generally parallel to a longitudinal axis of the second elongate support member. The shelving system includes one or more shelf members for holding bathroom toiletries, the shelf member connected to the first elongate support member with a connection mechanism. The shelving system including a shroud member adapted to be rotatable between a first position corresponding to a closed position and a second position corresponding to an open position, wherein the shroud member is configured to generally surround a first portion of the shelf member in the closed position and is configured to allow access to the first portion of the shelf member in the open position.

Certain embodiments of the shelving system can include any one, or any combination, of any of the following, in some embodiments, one of the first and second arms includes a user-actuatable locking mechanism configured to releasably secure the first elongate support member to the second elongate support member in one or more positions along the second elongate support member. In some embodiments, the connection mechanism includes a user-actuatable clamping device having a clamp body, clamp plate, and clamp lever, the clamping device configured to move between locked and unlocked positions, in which a position of the shelf member can be adjusted from a first position along the first elongate support member to a second position along the first elongate support member in a direction generally parallel to a longitudinal axis of the first elongate support member when the single user-actuatable device is in the unlocked position, and wherein the shelf member can be locked in place when the single user-actuatable device is in the locked position.

Various embodiments of the shelving system can include any one, or any combination, of any of the following. In some embodiments, the shroud member includes a detent assembly and bearing assembly positioned within one of the first and second arm members and configured to maintain the shroud member in two or more rotational rest positions corresponding to the closed and open positions. In some embodiments, the detent assembly comprises a detent block, wherein the detent block comprises a pair of detents in generally opposite positions from each other (e.g., spaced about 180 degrees from one another) around the detent block configured to receive a protrusion of the bearing assembly when the shroud member is in the rotational rest positions. In some embodiments, the shroud member in the open position is rotated 180 degrees about the first elongate support member from the closed position. In some embodiments, the shroud member includes a semi-cylindrical plate configured to surround at least half of an outer perimeter of the shelf member in the closed position.

BRIEF DESCRIPTION OF THE DRAWINGS

The abovementioned and other features of the embodiments disclosed herein are described below with reference to the drawings of the embodiments. The illustrated embodiments are intended to illustrate, but not to limit the embodiments. Various features of the different disclosed embodiments can be combined to form further embodiments, which are part of this disclosure.

DETAILED DESCRIPTION OF CERTAIN EMBODIMENTS

Various improved shelving systems are described. The shelving systems are described in the context of a shower caddy, due to particular utility in that context. However, the embodiments and inventions disclosed herein can also be applied to other types of devices and other environments, such as shelving units for kitchens, living rooms, bedrooms, cabinets, offices, and other environments outside of a shower.

Overview

Figure 1:
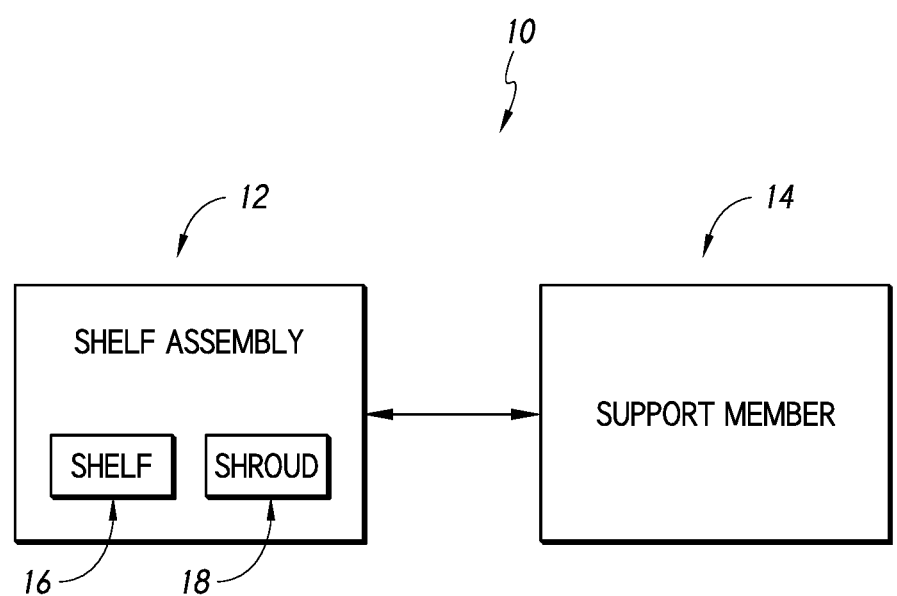
FIG. 1 schematically illustrates an embodiment of a shower caddy.

FIG. 1 schematically illustrates an embodiment of a shelving system, such as a shower caddy 10. As shown, the shower caddy 10 can include a shelf assembly 12 and a support member 14. The shelf assembly 12 can be coupled with the support member 14, such as to enable the shelf assembly 12 to be moved relative to (e.g., slid up and down along) the support member 14 and/or secured with the support member 14. In various embodiments, the support member 14 is configured to attach to a rigid structure of the environment, such as a shower pipe or a floor and/or ceiling of a shower. As shown, the shelf assembly 12 can include a shelf 16, which can be configured to support and/or organize bathing articles. The shelf assembly 12 can include a shroud 18 that is configured to selectively reveal and obscure the shelf 16 and the articles on the shelf 16. For example, the shroud 18 can be an opaque screen that can be rotated around the shelf 16.

Figure 2:
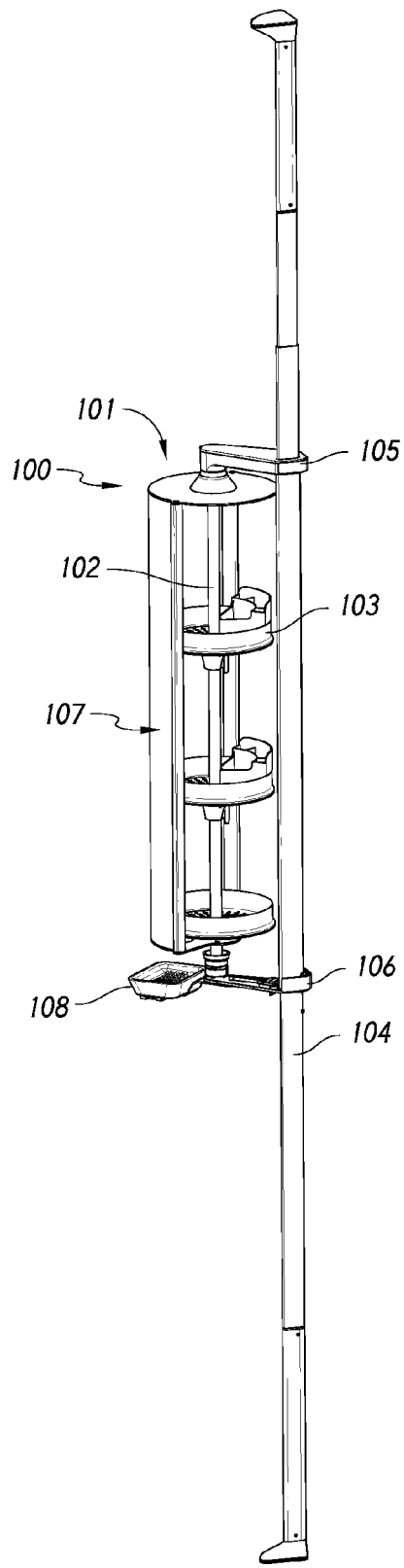
FIG. 2 illustrates a rear left perspective view of another embodiment of a shower caddy.
Figure 2A:
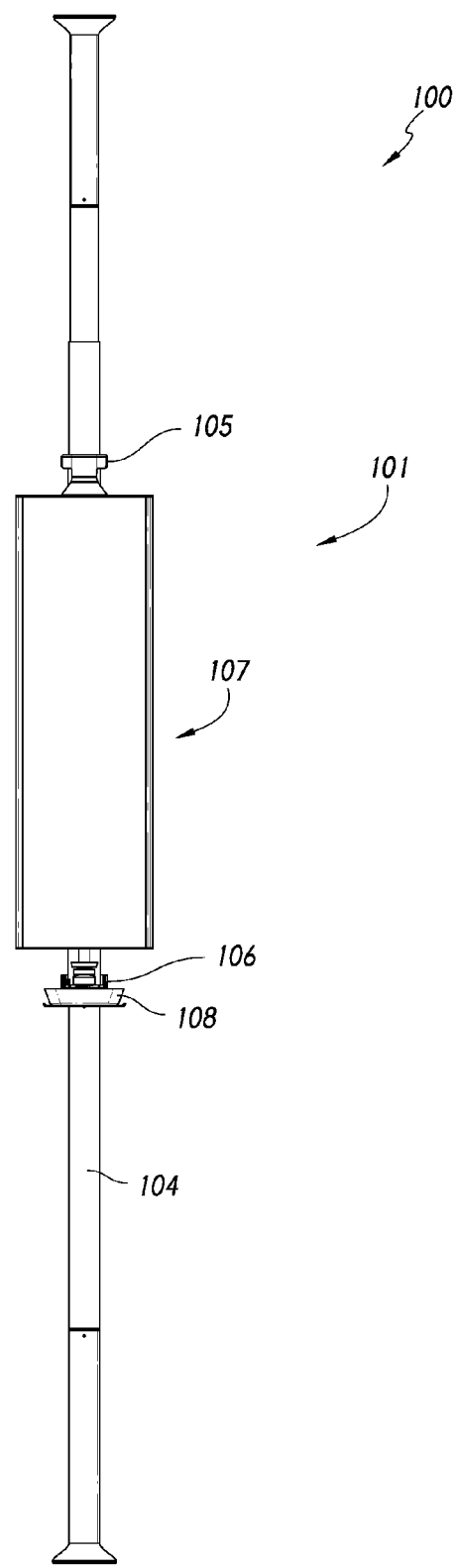
FIGS. 2A and 2B illustrate front elevation views of the shower caddy of FIG. 2 with a shroud in a closed position and an open position, respectively.
Figure 2B:
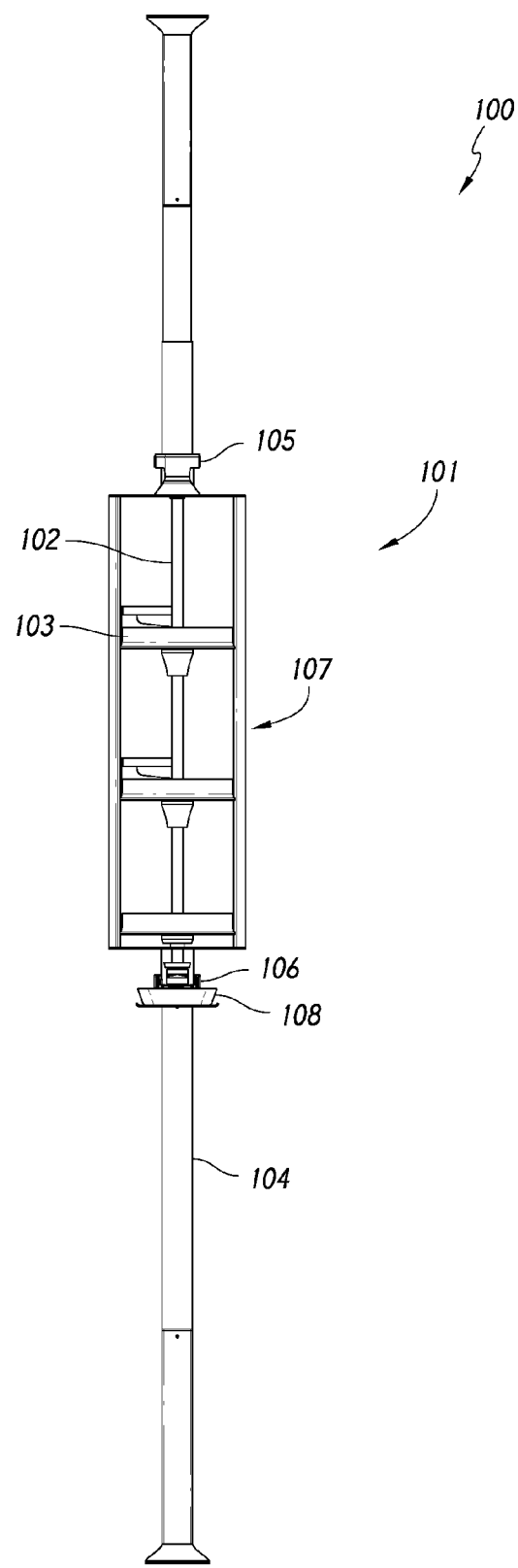

FIG. 2 illustrates another embodiment of a shower caddy 100. As shown, the shower caddy 100 can include a shelf assembly 101. The shelf assembly 101 can include a first support member 102 and one or more shelves 103. The shelf assembly 101 can be connected with a second support member 104, such as via the first and/or second arms 105, 106. As shown, the second support member 104 can be a rod assembly, which can be configured to extend between a floor and ceiling in a shower enclosure. As also shown, the shelf assembly 101 can include a shroud 107, which can be configured to Obscure a portion of the shelves 103 from view. For example, as shown in FIGS. 2A and 2B, the shroud 107 can be moved between a closed position (e.g., to obscure a portion of the shelves 103 from view) and an open position (e.g., to permit access and/or view of some or all of the shelves 103). Certain implementations have a soap tray 108, which can be rigidly or rotatably fixed to the first support member 102 or to one of the arms 105, 106.

Figure 3:
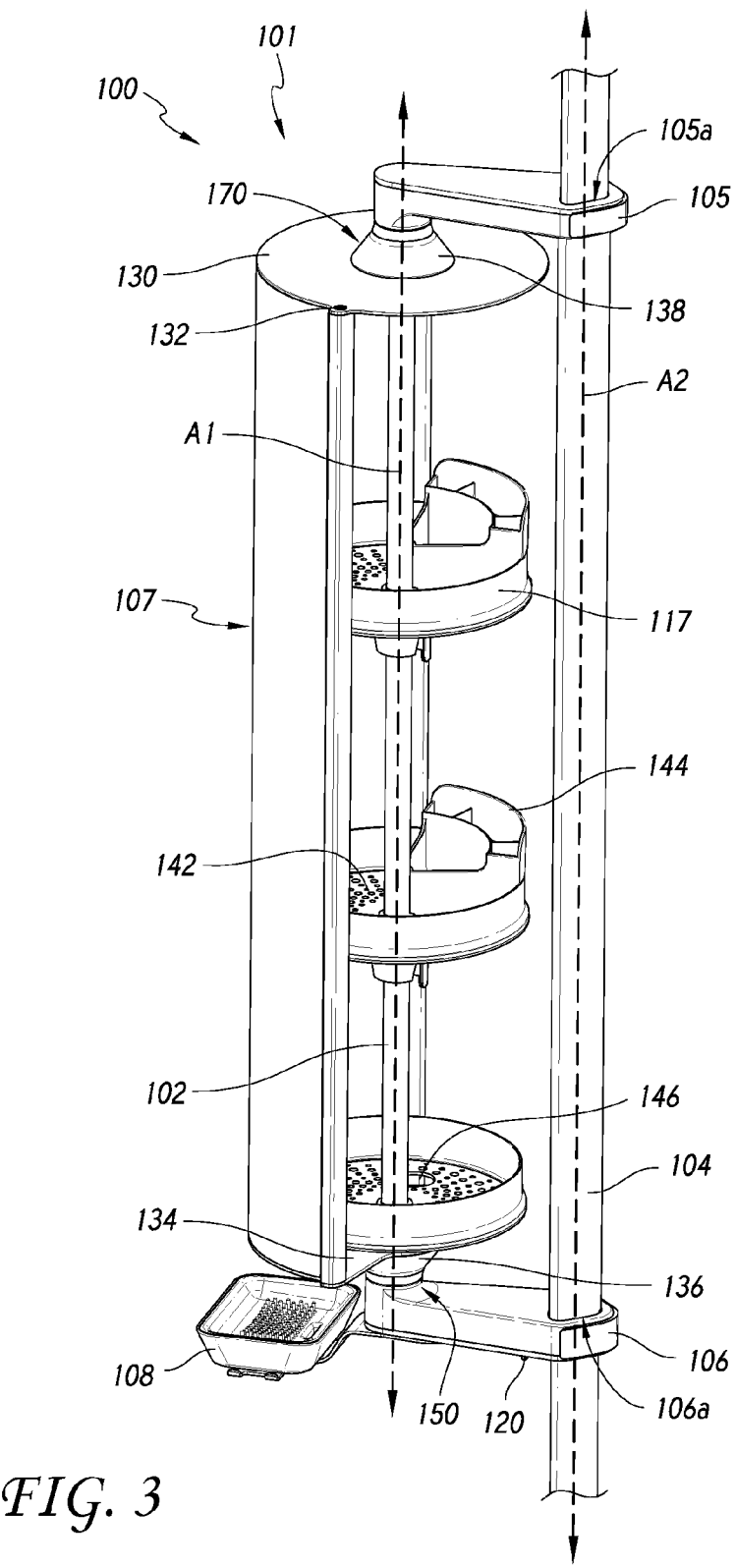
FIG. 3 illustrates an enlarged top perspective view of a portion of the shower caddy of FIG. 2.

The shelves 103 can be configured to facilitate storage and/or drying of bath or shower items. For example, as illustrated in FIGS. 2 and 3, the shelves 103 can include drainage holes 142, a soap tray 108, towel rack, and/or other accessories (e.g., hooks, dividers, baskets, or organizers 144, etc.). In certain implementations, one or more of the shelves 103 have openings 146 for holding bottles of toiletries (e.g., shampoo) upside down, with the cap of the bottle extending through the openings 146. In some embodiments, the shelves 103 are configured to be the same or similar or include one or more of any of the features of any of the shelves or racks described with respect to U.S. Pat. No. 8,408,405, which is incorporated herein by reference in its entirety.

As illustrated in FIG. 2, the shelves 103 can include article containment features, such as raised edges or walls 117. The walls 117 can encircle or surround the entire or substantially the entire perimeter or circumference of the shelves 103. In some embodiments, the raised edges or walls 117 are solid walls. In other embodiments, the raised edges or walls 117 include one or more wires, cables, or cylindrical tubes instead of a solid wall construction or configuration.

As described in further detail below, the shroud 107 can be configured to Obscure the contents of at least one of the shelves 103. For example, the shroud 107 can be a cover, gate, shield, curtain, cabinet, or screen that inhibits or prevents viewing and/or accessing of the contents of the shelves 103 in certain configurations. In various embodiments, the shroud 107 is movable (e.g., rotatable, retractable, pivoted about a joint or pin, etc.) between a first position and a second position. The first position can be a position in which the contents of the shelves 103 are closed, hidden, or concealed. The second position can be a position in which the contents of the shelves 103 are open, accessible, or viewable. This can provide the ability to selectively obscure or reveal the contents of the shelves 103, such as depending on whether the shroud 107 is placed in the first or second position.

In some embodiments, the shroud 107 is rotatable. In certain variants, the shroud 107 rotates about an axis A1 that extends axially through, and/or generally parallel to, a longitudinal axis of the first support member 102. In some embodiments, the shroud 107 rotates independently of or relative to the one or more shelves 103. In certain embodiments, the shroud 107 rotates relative to (e.g., around) the shelves 103. In some variants, the shroud 107 and shelves 103 rotate together. In some implementations, the shroud 107 has one degree of freedom of movement (e.g., around the axis A1). In certain variants, the shroud 107 has two degrees of freedom of movement (e.g., around the axis A1 and along an axis A2).

In various embodiments, some, substantially all, or the entire shower caddy 100 is made of one or more corrosion-resistant materials. For example, the first support member 102 and/or the second support member 104 can be aluminum (e.g., extruded aluminum, formed satin aluminum that is bead blasted with clear anodizing, etc.). The support members 102, 104 may be constructed of other suitable materials, including, but not limited to, steel, stainless steel, or any other metal, plastics, wood, or any other material.

Support Members

With continued reference to FIGS. 2 and 3, the support members 102, 104 can each be in the form of an elongate member, such as a pole, shaft, rod, or otherwise. Either or both of the support members 102, 104 may be the same or similar to, or include one or more of any of the features of, any of the support or elongate members described in U.S. Pat. No. 8,408,405, the entirety of which is incorporated herein by reference. For example, the second support member 104 (and/or the first support member 102) can have a telescoping configuration. In some embodiments, the upper and lower ends of one of the support members 102, 104 can be anchored against upper and lower stationary objects. For example, in some embodiments, a lower end of the second support member 104 can be pressed against the floor of a shower or bathtub and an upper end of the second support member 104 can be pressed against the ceiling above the shower or bathtub. The anchoring can occur with sufficient force to secure the entire shower caddy 100 in a desired position.

The first and second support members 102, 104 can have various cross-sectional shapes. For example, the first and second support members 102, 104 can have a cross-sectional shape that is generally: cylindrical, circular, triangular, trapezoidal, rectangular, square, or other angular cross-sectional configuration. In some embodiments, the first and/or second support members 102, 104 have an I-beam shaped cross-section. In certain implementations, the first and second support members 102, 104 have the same cross-sectional shape. As shown, in some variants, the first and second support members 102, 104 have different cross-sectional shapes. For example, the first support member 102 can have a generally circular cross-sectional shape and the second support member 104 can have a non-circular cross-sectional shape, such as generally: rectangular, diamond shaped, or otherwise. This can aid in allowing components (e.g., the shelves 103) to rotate about the first support member 102 and can inhibit components (e.g., the shelf assembly 101) from rotating about the second support member 104.

Arms

As noted above, the shower caddy 100 can include first and/or second arms 105, 106. The arms 105, 106 can be configured to facilitate spacing the first support member 102 and/or the shelf assembly 101 apart from the second support member 104. This can allow clearance for the movement of the shroud 107, as will be discussed in more detail below. In some embodiments, the arms 105, 106 are configured to facilitate moving (e.g., sliding) the first support member 102 and/or the shelf assembly 101 relative to the second support member 104. This can allow the shelf assembly 101 to be placed at a desirable position (e.g., a convenient height to allow access to articles on the shelves 103). In some embodiments, the arms 105, 106 are configured to facilitate securing (e.g., coupling, connecting, locking) the shelf assembly 101 with the second support member 104. This can aid in maintaining the shelf assembly 101 at the desirable position.

As shown in FIG. 3, the arms 105, 106 can connect the shelving assembly 101 with the second support member 104. In some embodiments, an end of the first arm 105 can be coupled to the shelf assembly 101 and another end of the first arm 105 can be coupled to the second support member 104. Similarly, an end of the second arm 106 can be coupled to the shelf assembly 101 and another end of the second arm 106 can be coupled to the second support member 104. In the illustrated embodiment, the arms 105, 106 connect to top and bottom portions of the first support member 102 of the shelf assembly 101, respectively. In some other embodiments, the first and/or second arms 105, 106 couple with other portions along the length of the first support member 102, such as at approximately: ¼ of the length, ⅓ of the length, ½ of the length, ⅔ of the length, ¾ of the length, or otherwise. As illustrated, in certain embodiments, the first and second arms 105, 106 extend generally orthogonally away from a longitudinal axis A2 of the second support member 104 and/or towards the first support member 102.

The first and second arms 105, 106, respectively, can include a receiving element 105a, 106a, such as an aperture or recess. For example, as shown in FIG. 3, a portion of the second support member 104 can extend through the receiving elements 105a, 106a. In some embodiments, the receiving elements 105a, 106a and the second support member 104 have a corresponding or mating shape. In some embodiments, such a corresponding or mating shape can inhibit or prevent the one or more arms 105, 106 and/or the shelf assembly 101 from rotating about the second support member 104. For example, the shape can be polygonal (e.g., triangular, rectangular, etc.) or otherwise non-circular.

In some embodiments, the first and/or second arms 105, 106 are movably connected to the second support member 104. For example, the arms 105, 106 and the shelf assembly 101 can slide vertically in an axial direction along the second support member 104. In some implementations, the arms 105, 106 and the shelf assembly 101 can rotate about the longitudinal axis A2 of the second support member 104. In some embodiments, the arms 105, 106 and the shelf assembly 101 can have at least one or two degrees of freedom relative to the second support member 104.

Figure 4:
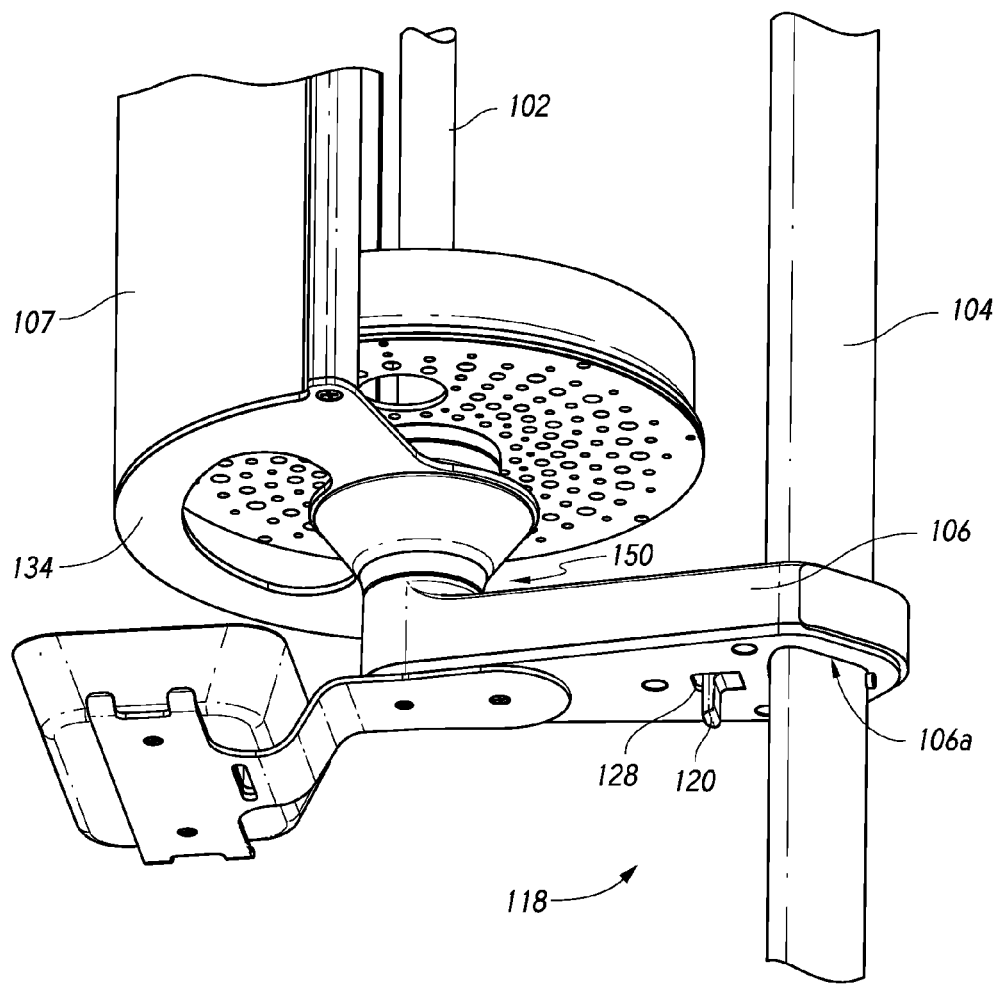
FIG. 4 illustrates an enlarged bottom perspective view of a portion of the shower caddy of FIG. 2.

As illustrated in FIG. 4, at least one of the first and second arms 105, 106 can include a locking mechanism 118. For example, in the illustrated embodiment, the second arm 106 (e.g., a bottom arm) includes the locking mechanism 118. The locking mechanism 118 can be configured to releasably engage (e.g., secure, lock, or fix) the arms 105, 106 and the shelf assembly 101 with the second support member 104. This can enable the shelving assembly 101 to be moved relative to the second support member 104. In some embodiments, the locking mechanism 118 is configured to be toggled between a locked position (e.g., in which the arms 105, 106 and the shelf assembly 101 are secured in position relative to the second support member 104) and an unlocked position (e.g., in which the arms 105, 106 and the shelf assembly 101 are movable along the longitudinal axis A2 of the second support member 104 and/or rotatable about the longitudinal axis A2 of the second support member 104).

The locking mechanism 118 can include an actuatable component 120, such as a handle, lever, switch or otherwise. The actuatable component 120 can be movable between a first position and a second position corresponding to the locked and unlocked positions, respectively. An engagement mechanism 122, such as a pin, can be coupled to the actuatable component 120. In certain embodiments, when the actuatable component 120 is in the first position, the engagement mechanism 122 is engaged with a corresponding engagement structure 124 (e.g., hole, opening, channel, aperture, recess, etc.) in the second support member 104. For example, as shown in FIG. 4, a pin of the locking mechanism 118 can be received in an aperture in the second support member 104. This can provide a physical interference that inhibits the arm 106 (and/or the shelving assembly 101 as a whole) from moving relative to the second support member 104. In certain implementations, when the locking mechanism 118 is in the locked position, some or all of the weight of the shelf assembly 101 is transferred to the second support member 104 via the locking mechanism 118 (e.g., such as through the interference between the pin and the second support member 104).

Figure 5:
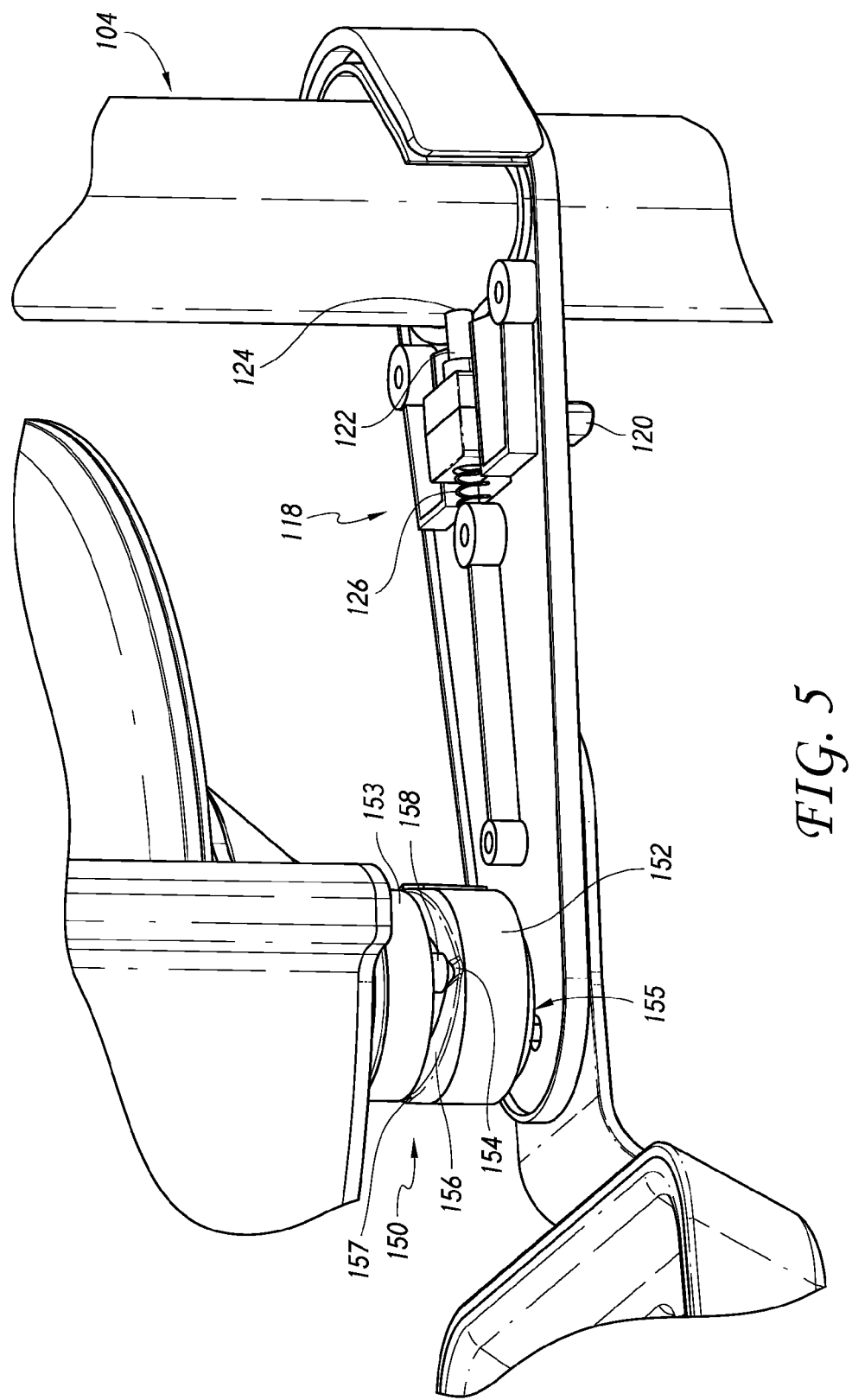
FIG. 5 illustrates an enlarged top perspective view of a portion of the shower caddy of FIG. 4 with certain components hidden.
Figure 6:
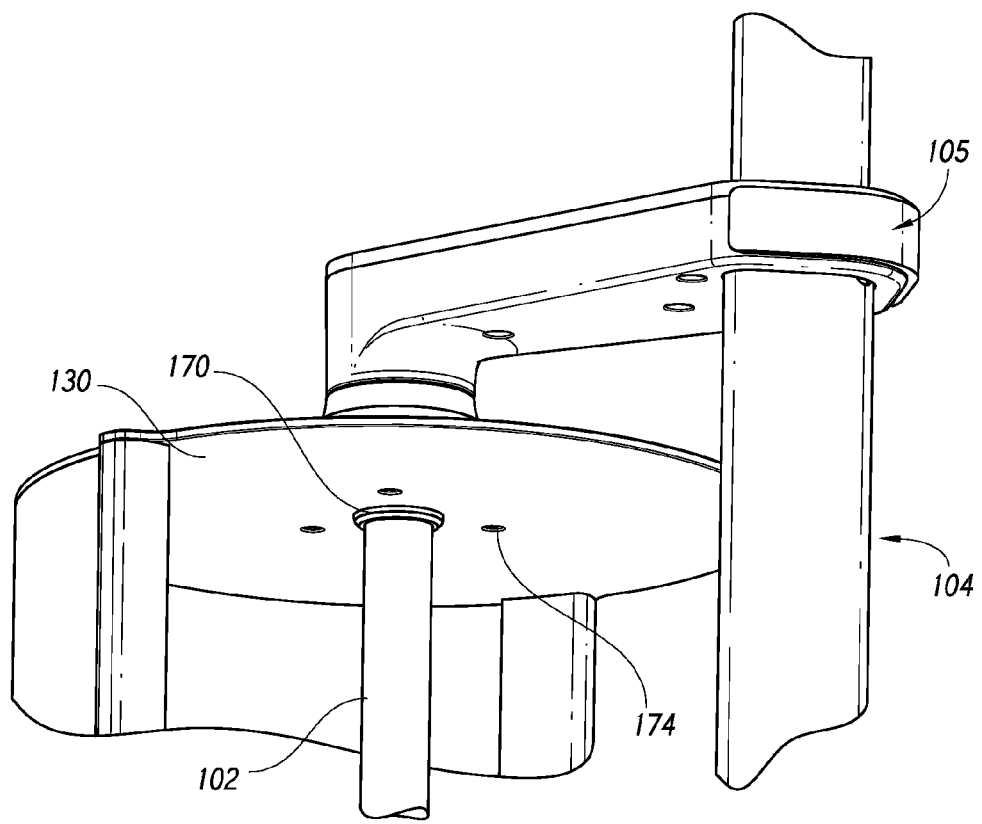
FIG. 6 illustrates an enlarged bottom perspective view of a portion of the shower caddy of FIG. 2.
Figure 7:
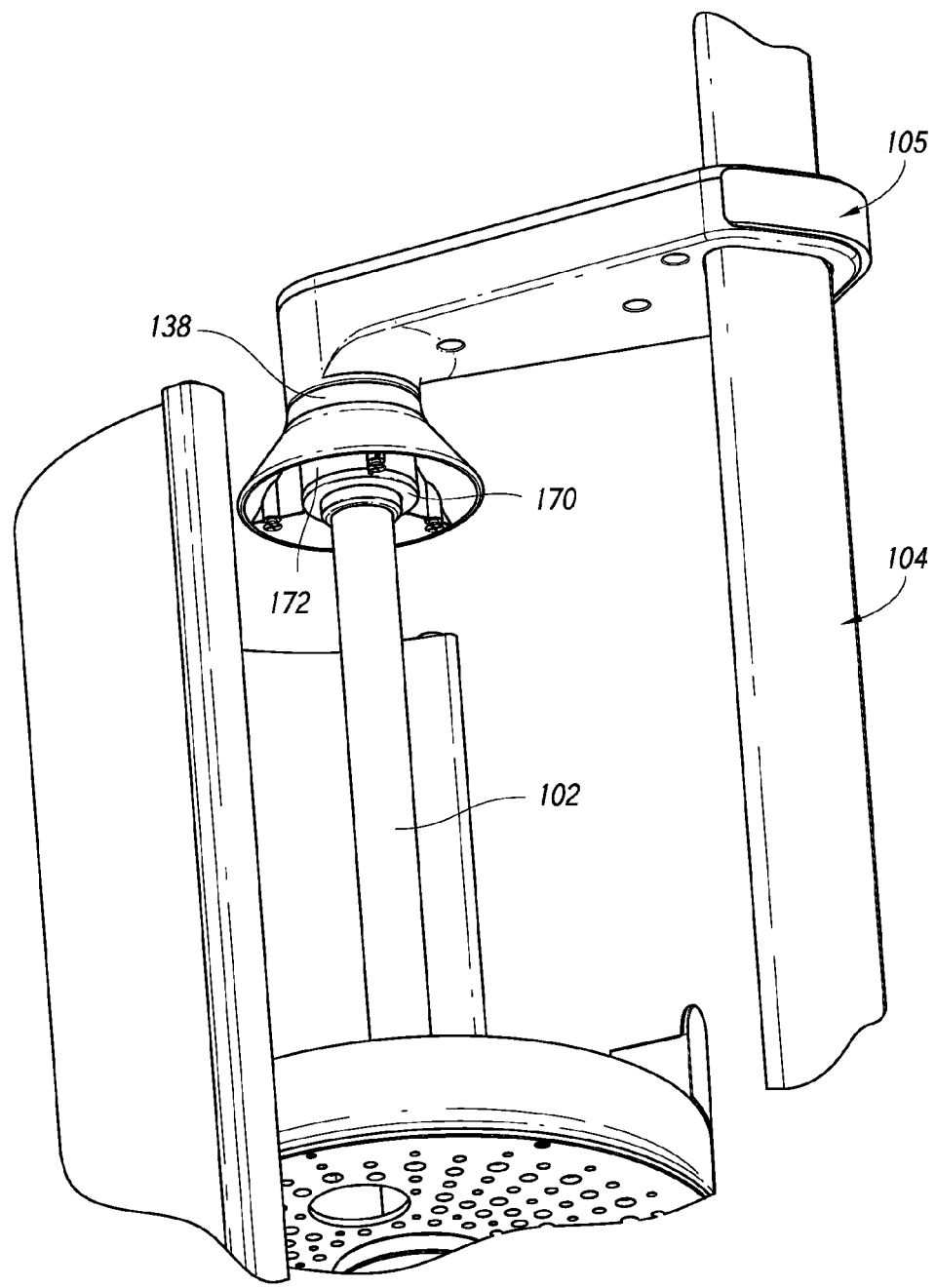
FIG. 7 illustrates a view of the portion of the shower caddy shown in FIG. 6 with certain components hidden.

In certain embodiments, when the actuatable component 120 is in the second position, the engagement mechanism 122 and the corresponding engagement structure 124 are disengaged from each other. In some variants, the engagement mechanism 122 can be positioned away from and/or out of the engagement structure 124. For example, with reference to the embodiment shown in FIG. 5, the pin can be withdrawn from the aperture in the second support member 104, thereby removing the physical interference connecting the arm 106 and the second support member 104. This can allow the arm 106 (and/or the shelving assembly 101 as a whole) to be relative to the second support member 104. In some embodiments, the second support member 104 includes a plurality of the engagement structures 124 at various positions along and/or around the second support member 104, such as at various heights and/or positions about the circumference or outer perimeter of the second support member 104. This can provide flexibility in selecting where to position the arm 106 along the second support member 104.

In some embodiments, the actuatable component 120 of the locking mechanism 118 is configured for ready access by a user. For example, as shown, the actuatable component 120 can be located on the arm 106, such as on a lower surface of the arm 106. In some variants, during movement of the actuatable component 120 from the first position to the second position, the actuatable component 120 is pushed or pulled away from the second support member 104 and/or towards the first support member 102. In some embodiments, the actuatable mechanism 120 is moved within an aperture, recess, opening or space 128 in the arm 106.

The locking mechanism 118 can include a biasing member 126, such as a spring. The biasing member 126 can bias the engagement mechanism 122 into engagement with the engagement structure 124. This can encourage the locking mechanism 118 toward the locked position. For example, in some variants, when no force is applied to the actuatable mechanism 120 by the user, then the engagement mechanism 122 is pushed toward the second support member 104 (e.g., toward the engagement structure 124). In various embodiments, the locking mechanism 118 can be spring-loaded.

Shroud

As previously mentioned, some embodiments include a shroud 107. The shroud 107 can be a cover, gate, shield, curtain, or screen that inhibits or prevents viewing of the contents of the shelves 103 in certain configurations. In the embodiment illustrated, the shroud 107 includes a curved opaque plate. In some embodiments, the shroud 107 is opaque (e.g., allows the passage therethrough of no or substantially no light). In some variants, the shroud 107 is translucent, thereby allowing passage therethrough of some light (e.g., less than or equal to about: 50%, 30%, 20%, 10%, 5%, values between the aforementioned values, or other values).

The shroud 107 can be configured to enable a user to selectably obscure one or more of the shelves 103 and their contents from view. This can protect the privacy of a user by hiding certain articles on the shelves 103 from view. For example, during a party or other social occasion, the shroud 107 can hide articles on the shelves 103 from being Observed by guests that use the bathroom in which the shower is located.

The shroud 107 can enhance the aesthetic of a shower. Users may choose to store many different articles (e.g., shampoos, body washes, razors, wash cloths, etc. the shelves 103, which can lead to a disorganized appearance. Also, articles on the shelves 103 may drip or otherwise cause a mess, which can further reduce the aesthetic of the shower. The shroud 107 ameliorates such problems by hiding the shelves 103, as well as the articles and/or the associated mess. This can provide an organized and/or clean appearance of the shower. For example, the shroud 107 can provide a streamlined look for the shower. The ability, using the shroud 107, to conceal portions of the shelves 103 and/or personal articles positioned thereon when not in use or as desired) can confer an improved quality, feel, functionality, and/or a more luxurious, seamless and aesthetically-pleasing appearance.

As illustrated in FIGS. 2 and 3, the shroud 107 can partially cover or surround portions of the one or more shelves 103. For example, as shown, the shroud 107 can extend around a portion of the circumference of the shelves 103 and fully or partially between a top plate 130 and a bottom plate 134 of the shelf assembly 101. In some embodiments, the shroud 107 includes a half or semi-circular, cylindrical, arced, or arched wall, plate, or base. In some embodiments, the shroud 107 has an angular, wedged, generally V-shaped, generally U-shaped, rectangular, and/or planar wall or base configuration. The shroud 107 can extend partially or substantially around the entire outer circumference or perimeter of the one or more shelves 103. For example, the shroud 107 can extend around a portion of the circumference or perimeter of the one or more shelves 103, such as at least ⅛, ¼, ⅜, ½, ⅝, ¾, ⅞, or any value between the aforementioned values. The shroud 107 can be configured to extend around various amounts of the circumference or perimeter of the one or more shelves 103, such as at least approximately: 45°, 90°, 135°, 180°, 225°, 270°, 315° and/or any value therebetween. For example, in the embodiment illustrated, the shroud 107 extends around approximately 180 degrees (e.g., approximately half) of the circumference of the one or more shelves 103.

In various embodiments, the shroud 107 can be configured to move (e.g., relative the shelves 103 and/or the second support member 104) between a first position and a second position. For example, the shroud 107 can be configured to rotate, retract, pivot, or slide between the first and second positions. In the first position, the shroud 107 can surround or cover at least a first portion of the shelves 103, such as a front or anterior portion. This can obscure from view (e.g., conceal, cover, hide, block, and/or render generally inaccessible) some or all of the shelves 103, as well as one or more personal articles (not shown) positioned on the shelves 103. In the second position, the shroud 107 can extend around a second portion of the shelves 103, such as a rear or posterior portion. This can provide ready access to, and viewing of, the articles on the shelves 103.

In the embodiment illustrated, the shroud 107 rotates about a longitudinal axis A1 of the first support member 102. In certain variants, between the first and second positions, the shroud 107 rotates approximately 180° about A1. In some embodiments, the shroud 107 is configured to rotate about A1 at least about: 15°, 30°, 45°, 60°, 75°, 90°, 105°, 120°, 135°, 150°, 165°, 195°, 210°, 225°, 240°, 255°, 270°, 285°, 300°, 315°, 330°, 345°, values between the aforementioned values, or other values. In certain embodiments, the shroud 107 can be moved to intermediate positions, such as positions between the first and second positions. This can provide flexibility in the amount of the shelves 103 that is concealed and revealed, and/or in the amount of access that is permitted to the shelves 103 and the articles thereon.

In some embodiments, the shroud 107 is coupled to the top plate 130 and the bottom plate 134 of the shelving assembly 101. For example, as shown in FIG. 3, the shroud 107 can be coupled to the plates 130, 134 via one or more fastening members 132 (e.g., screw, pins, rivets, welds, or otherwise). In some embodiments, one or both of the plates 130, 134 has a shape that corresponds to the outer shape of one or all of the shelves 103. For example, as shown, the plates 130, 134 and the shelves 103 can each have a generally round peripheral shape. In certain embodiments, the plates 130, 134 have different shapes than the shelves 103. As shown in FIG. 4, one or both of the plates 130, 134 can have an opening or channel to facilitate airflow and/or drainage.

In certain implementations, the top and bottom plates 130, 134 are coupled to the first and second arms 105, 106 via upper and lower collars 138, 136, respectively. The top and bottom plates 130, 134 can have openings through which the first support member 102 extends. In various embodiments, the shroud 107, plates 130, 134, and/or collars 138, 136 are rotatable about the first support member 102 (e.g., providing at least one degree of freedom) between at least the first and second positions.

In various embodiments, the shelf assembly 101 includes features to facilitate rotation of the shroud 107. For example, as shown in FIGS. 2 and 5-7, the shelf assembly 101 can have lower and/or upper bearing assemblies 150, 170, such as bearings, bushings, or otherwise. The bearing assemblies 150, 170 can be configured to enable the shroud 107, plates 130, 134, and/or collars 136, 138 to rotate around the shelves 103 and/or the first support member 102. For example, in some embodiments, the shroud 107 is configured to rotate at least about 180° and/or less than or equal to about 360° around the shelves 103. In certain variants, shelves 103 and the shroud 107 remain rotationally fixed relative to each other (e.g., the shelves 103 and the shroud 107 are directly or indirectly rigidly connected together). In some implementations, the shelves 103 and the shroud 107 rotate around the first support member 102.

In some embodiments, the bearing assemblies 150, 170 are positioned between the first support member 102 and the collars 138, 136, plates 130, 134, mod/or arms 105, 106. For example, the bearing assemblies 150, 170 can be positioned around or adjacent an exterior surface of the first support member 102 and an interior surface of the collars 138, 136. In some embodiments, the upper bearing assembly 170 is coupled or connected to a downwardly extending inner surface 172 of the upper collar 138. The upper bearing assembly 170 is positioned between an outer surface of the first support member 102 and a perimeter of an aperture or hole in the upper plate 130. Such a configuration can allow the plate 130, shroud 107, and/or collar 138 to rotate about the first support member 102 extending through the aperture or hole in the upper plate 130. The upper plate 130 can be attached or coupled to the collar 138 by engagement or fastening members 174, such as screws or pins. In some implementations, the lower bearing assembly 150 is similarly rotatably connected with the first support member 102.

Detent Assembly

In some embodiments, one or both of the bearing assemblies 150, 170 includes a position facilitating assembly, such as a detent assembly. For example, in the shower caddy 100, the lower bearing assembly 150 includes the detent assembly. The detent assembly can be configured to bias or urge the shroud 107 into or towards one or more discrete and/or rotational positions. For example, the detent assembly can encourage the shroud 107 into or toward the first or second positions discussed above (e.g., an obscuring position and a non-obscuring position, closed position and an open, or otherwise).

Figure 8:
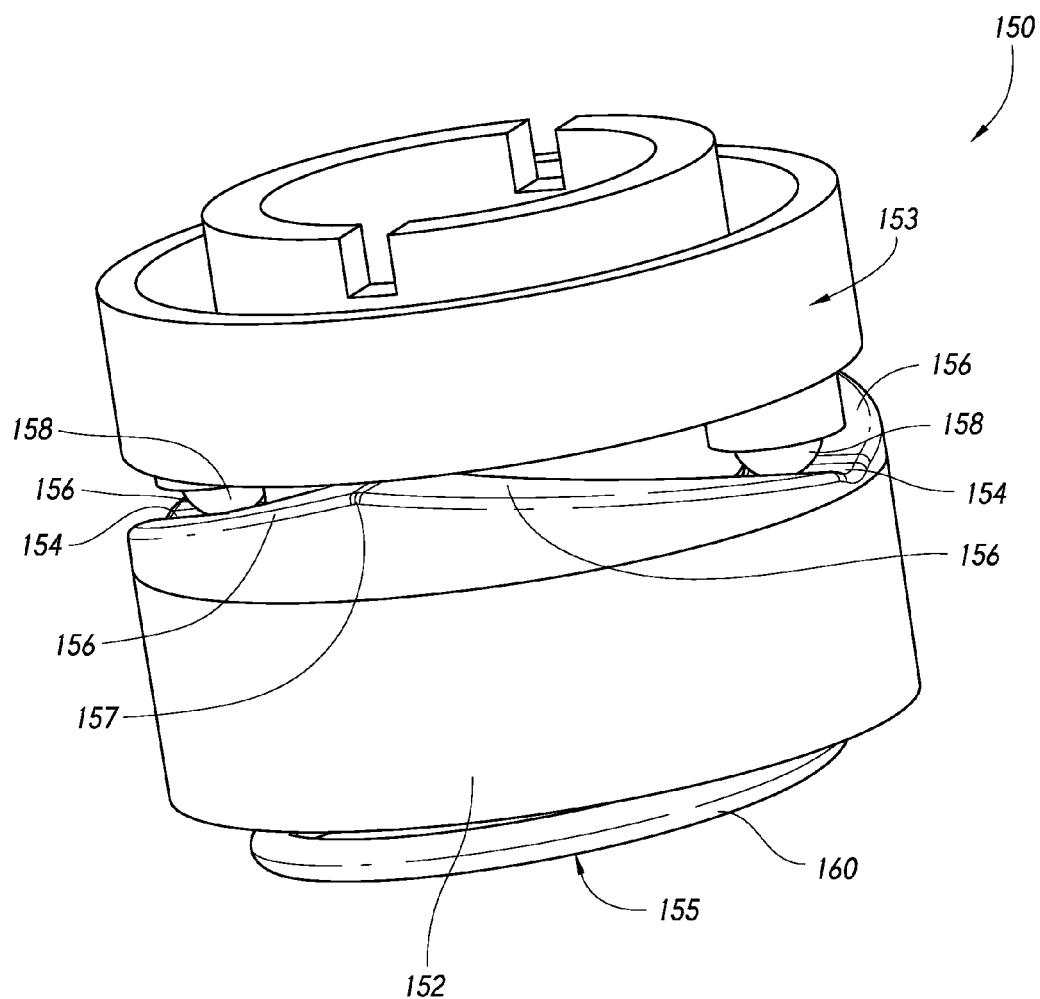
FIG. 8 illustrates a perspective view of a detent assembly.

FIG. 8 illustrates an example of the detent assembly. As shown, the detent assembly can include a lower detent block 152. The lower detent block 152 can include one or more recesses 154 and one or more raised portions 157 (e.g., formed along an upper surface of the lower detent block 152). For example, as shown, the lower detent block 152 can include first and second recesses 154 and first and second raised portions 157. In some implementations, the first and second recesses 154 and/or the first and second raised portions 157 are positioned at approximately opposite sides of the detent block 152 (e.g., spaced or positioned 180 degrees from each other and/or positioned at about 0° and 180°, respectively).

The detent assembly can include an upper detent block 153. As shown, the upper detent block 153 can have one or more protrusions 158, such as a tab or ball. Some embodiments have first and second protrusions 158. As shown, the first and second protrusions 158 can be positioned on approximately opposite sides of the upper detent block 153.

The detent assembly can include a biasing member, such as a spring 155. In certain variants, the spring 155 is compressed between the lower detent block 152 and the arm 106. In some embodiments, the spring 155 biases the lower detent block 152 upwardly and/or into engagement with the upper detent block 153.

With continued reference to FIG. 8, the lower and upper detent blocks 152, 153 can interact to provide rotational rest positions. Such positions can be positions in which the blocks 152, 153 tend not to rotate relative to each other. In certain embodiments, a rotational rest position is achieved when corresponding features of the lower and upper detent blocks 152, 153 are rotationally aligned (e.g., raised portions of one of the detent blocks are received in recessed portions of the other, or vice versa). For example, in some embodiments, the recess 154 and/or the raised portion 157 of the lower detent block 152 can engage with the protrusion 158 on the upper detent block 153, which can urge the protrusion 158 into the recess 154 and can produce a rotational rest position. Similarly, in some embodiments, a lower surface of the upper detent block 153 can include a recess that can be urged into juxtaposition with the raised portions 157 of the lower detent block 152, thereby producing a rotational rest position. In various embodiments, the number of recesses 154 and/or raised portions 157 determines the number of rotational rest positions for the shroud 107. For example, a pair of recesses can correspond to two rotational rest positions.

In various implementations, when the upper detent block 153 is in a rotational rest position, the shroud 107 is in a rotational rest position as well. This is because, in some embodiments, the upper detent block 153 is rigidly connected with the shroud 107 (e.g., via the plate 134). In some variants, when the protrusion 158 is positioned within or generally aligned with a first recess, the shroud 107 is in a closed position, and when the protrusion 158 is positioned within or generally aligned with a second recess (e.g., located approximately 180 degrees from the first recess) the shroud 107 is in an open position. In some implementations, the bias of the spring 155 can aid in maintaining the blocks 152, 153 in the rotational rest position.

In some embodiments, a plurality of (e.g., two or more) rotatable rest positions are provided, such as an open position, a closed position, and at least one intermediate position. For example, one, two, three, four, or more corresponding recesses 154, raised portions 157, and/or corresponding ramped surfaces 156 can be provided, such as on opposite sides or about 180° apart from each other on the lower detent block 152. Pairs of recesses 154 and raised portions 157 can be formed about 180° apart from each other at various positions between the closed and open positions. For example, pairs of recesses 154 and/or raised portions 157 can be formed on opposite sides of the detent block 152 at about: ±15°, ±30°, ±45, ±60°, ±75°, ±90°, ±105°, ±120°, ±135°, ±150°, ±165°, ±180°, 0° and 180°, value between the aforementioned values, or other values. This can provide flexibility in positioning the shroud 107 and/or provides the shroud 107 with multiple rotatable rest positions between the closed and open positions.

Certain embodiments require an initial force to move the shroud 107 from a rotational rest position, such as the open and closed positions of the shroud 107. In sonic implementations, the initial force (e.g., a force that is generally tangential to the periphery of the shroud 107) must be sufficient to overcome a force of the spring 155 urging the protrusion 158 into the recess 154.

In some embodiments, the detent assembly is configured to aid in rotating the shroud 107 to a rotational rest position. For example, when a user rotates the shroud 107 to a position between the closed and open position (or another position in which the protrusion 158 is not aligned with recess 154) and then releases the shroud 107, the detent assembly can motivate the shroud 107 to rotate to the open or closed positions (or another position in which the protrusion 158 is aligned with recess 154). In some implementations, when the shroud 107 is rotated from the closed position and the protrusion 158 is moved up the first ramped surface 156 towards the adjacent raised portion 157, and the shroud 107 is released, then the interaction of the spring 155, first ramped surface 156, protrusion 158, and detent block 152 will tend to urge the protrusion 158 back down the first ramped surface 156 toward alignment with the recess 154 and into the closed position. In certain variants, when the shroud 107 is rotated from the closed position and the protrusion 158 is moved up the first ramped surface 156 past the adjacent raised portion 157 to a second ramped surface 156 on a second side of the raised portion 157, and the shroud 107 is released, the interaction of the spring 155, second ramped surface 156, protrusion 158, and detent block 152 can motivate the protrusion 158 down the second ramped surface 156. This can urge the protrusion 158 into alignment with the second recess 154 (e.g., on the opposite side of the first recess 154).

In some embodiments, in response to movement of the shroud 107 (e.g., by a user moving the shroud 107), the detent assembly (and thus the shroud 107) can appear to "automatically" move to a rotational position. For example, after a user applies an initial force (e.g., to move the protrusion 158 beyond an apex of the raised portion 157), the shroud 107 can appear to move the remainder of the way to the next rotational rest position on its own, such as because of the protrusion 158 being motivated down the ramped surfaces 156 into the recesses 154.

In some implementations, the shower caddy 100 is configured to provide tactile feedback to a user during movement of the shroud 107. For example, the above-described manner in which the shroud 107 is maintained in one of the open and closed positions via the detent assembly, and/or in which the shroud 107 is moved between the open and closed positions, provides tactile feedback to the user. This can provide an indication to the user, such as a positioning of the shroud 107. In some implementations, the detent assembly facilitates substantially silent movement of the shroud 107 and/or can promote a smooth and elegant operation, which can suggest a high-quality of workmanship of the shower caddy 100.

Clamping Mechanism

As noted above, the caddy 100 can include one or more shelves 103. In some embodiments, the shelves 103 can be rotatable and/or adjusted in the vertical direction relative to the longitudinal axis A1 of the first support member 102 (e.g., move or articulate about two degrees of freedom). This can allow the shelves 103 to be positioned as desired (e.g., along and/or around the first support member 102) or to accommodate other devices or appliances that may be in a user's shower, as well as various sizes of items, such as toiletries, that may be oversized.

Figure 9:
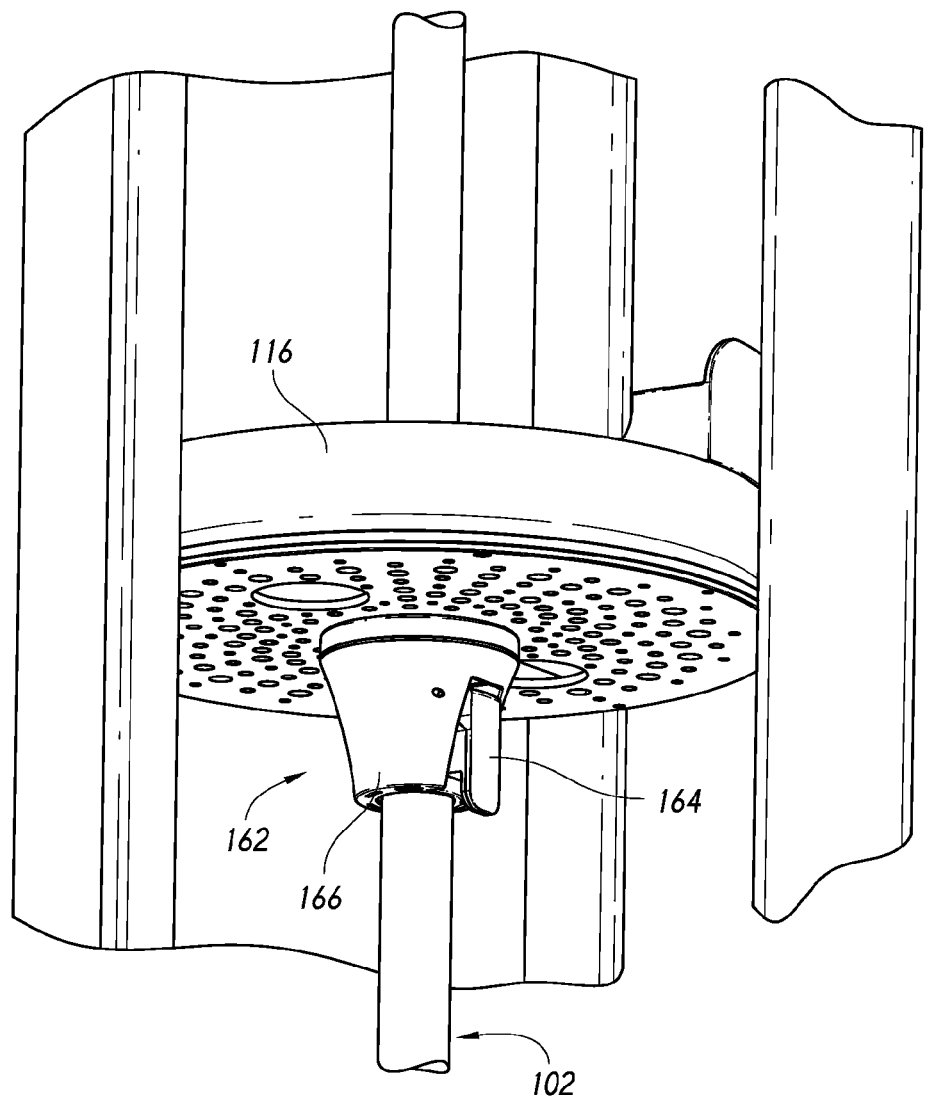
FIG. 9 illustrates an enlarged bottom perspective view of a portion of the shower caddy of FIG. 2.
Figure 10:
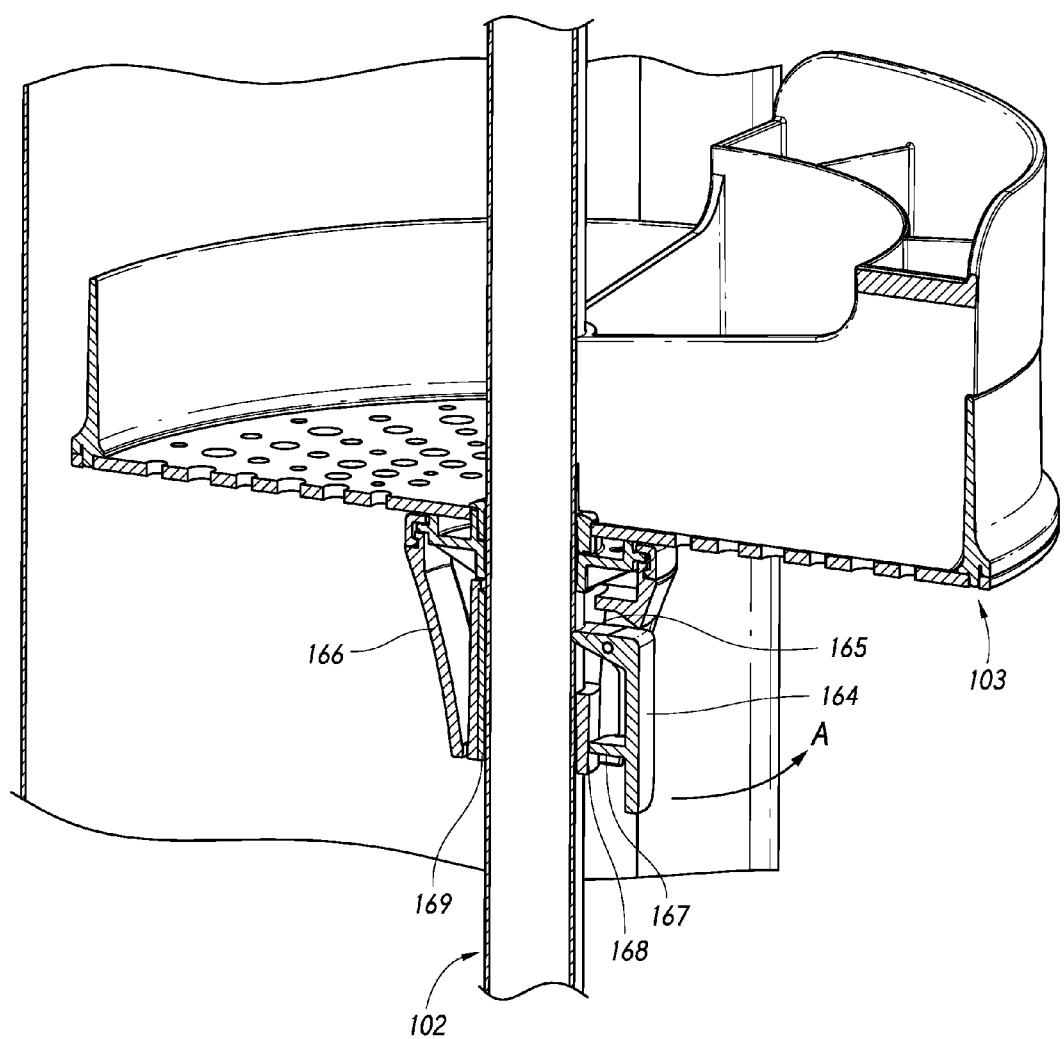
FIG. 10 illustrates a top perspective cross-sectional view of a portion of the shower caddy illustrated in FIG. 9.

Certain embodiments of the shower caddy 100 include features configured to selectively secure the shelves 103, such as a clamping mechanism 162. As shown in FIGS. 9 and 10, the clamping mechanism 162 can be configured to releasably secure and support one of the shelves 103 on the first support member 102. In some variants, one or more of the shelves 103 are rigidly or fixedly coupled to the first support member 102. The clamping mechanism 162 may be configured the same or similar to or include one or more of any of the features of any of the clamping mechanisms described with respect to U.S. Pat. No. 8,408,405, the entirety of which is incorporated herein by reference, or may include any of the features described herein. As will be described in more detail below, the clamping mechanism 162 can be configured to allow a user to adjust a position of the shelves 103 in addition to holding it in place on the first support member 102.

The clamping mechanism 162 can be slidably mounted on the first support member 102 in the vertical or longitudinal direction and/or rotatably mounted about the longitudinal axis A1 of the first support member 102. As shown in FIG. 9, the clamping mechanism 162 can have a body 166, such as a portion that surrounds or fits around the entire or substantially the entire perimeter of the first support member 102. The clamping mechanism 162 be configured to couple to a bottom surface of a shelf 103. As described in more detail below, the shelf 103 can be adjusted, rotatably and/or vertically about the longitudinal axis A1 of the first support member 102, when the clamping mechanism 162 is loosened. When the clamping mechanism 162 is tightened, the shelf 103 is secured to the first support member 102 in a fixed position. Thus, the clamping mechanism 162 can be configured to hold the shelf 103 in place, even when the shelf 103 is loaded with the maximum design weight and/or in wet environments, such as a shower.

In some implementations, the clamping mechanism 162 includes an outer clamp body 166 and clamp lever 164. The clamp body 166 can have an internal gasket, clamping plate, or clamping surface 168 that surrounds and/or engages a portion of, substantially the entire, or the entire outer surface or perimeter of the first support member 102. The internal surface 168 can be configured as a curved surface extending radially outward around the perimeter of the first support member 102.

In certain variants, the clamp lever 164 can be rotatably mounted relative to the clamp body 166. The lever 164 can be configured to move between open (or unlocked) and closed (or locked) positions. For example, the lever 164 can be configured to secure the shelf 103 to the first support member 102 when the lever 164 is in the closed position and to allow the shelf 103 to be moved (e.g., vertically and/or rotatably) when the lever 164 is in the open position. In some embodiments, the clamp lever 164 can be formed of a translucent material, such as translucent polycarbonate. In some embodiments, the clamp lever 164 can be formed of a material comprising polyoxymethylene, such as Delrin®. In some variants, the clamp lever 164 is made of steel, stainless steel, aluminum, or plastic.

In some embodiments, the lever 164 can include a cam 165 (which can be identical or similar to, or include one or more of the features of, the cams described is U.S. Pat. No. 8,408,405). In certain variants, the lever 164 has a movement converting feature, such as an inwardly protruding surface 167 (e.g., a surface that extends generally towards the center of the first support member 102). The protruding surface 167 can be configured to convert the pivotal movement of the lever 164 into a translational movement and/or radially inward force of the cam 165 and/or inner surface 168 against the first support member 102 to secure the shelf 103 in position. For example, the lever 164 can be hinged or otherwise pivotally mounted relative to the clamp body 166, as shown in FIGS. 9 and 10.

In some embodiments, the cam 165 can include at least a first portion having a radius R1 and a second portion with a radius R2, R2 being larger than R1. When the lever 164 is rotated such that the first portion is juxtaposed with the outer surface of the first support member 102 and the protruding surface 167 is disengaged from the inner surface 168, the clamp device 162 is in the open position. In some variants, when the lever 164 is rotated such that the second portion is juxtaposed with the outer surface of the first support member 102 and the protruding surface 167 is engaged and/or in contact with the inner surface 168, the clamp device 162 is in the closed position. These movements are described in greater detail below.

In some embodiments, the cam 165 can include a third portion having a radius R3 which is larger than radius R2. As such, the cam 165 can be configured to provide an "over-center" operation. For example, with the radius R3 being larger than both the radiuses R1 and R2, the cam 165 will generate a maximum pressing force against the outer surface of the first support member 102 when the third portion is juxtaposed with the outer surface of the first support member 102. This pressing force can be reduced as the lever 164 is further pivoted until the second portion is juxtaposed with the outer surface of the first support member 102 and/or the protruding surface 167 is engaged with (e.g., abutted against) the inner surface 168. This can provide the user with a tactile signal that the lever 164 has been moved to the closed position.

In some variants, the lever 164 is configured to move more rapidly during certain portions of its travel than in other portions of its travel. For example, the lever 164 can be configured to move rapidly from the intermediate position (e.g., in which the third portion is juxtaposed with the outer surface of the first support member 102) to the closed position (e.g., in which the second portion is juxtaposed with the outer surface of the first support member 102 and the protruding surface 167 is engaged and/or in contact with the inner surface 168). In some implementations, the lever 164 is configured to move between the intermediate and closed positions more rapidly (e.g., with less rotation and/or time) than it moves between the open and intermediate positions.

FIGS. 9 and 10 show an example of the lever 164 in the closed position, which is when the clamping mechanism 162 is tightened to hold the shelf 103 in place. In this closed position, the clamping mechanism 162 is secured to the first support member 102 by the pressing force (e.g., radially inward force, friction force) generated by the cam 165 against the outer surface of the first support member 102, such as when the second portion is juxtaposed with the outer surface of the first support member 102 and/or the protruding surface 167 is engaged and/or in contact with the inner surface 168. In certain embodiments, the inner surface 168 is configured to act as a stopping member to maintain the clamping mechanism 162 in the closed position (e.g., such that the lever 164 is in a generally vertical position or orientation and the second portion of the cam 165 is juxtaposed with the outer surface of the first support member 102) and/or to inhibit the clamping mechanism 162 from over-rotating or rotating past the closed position. In some embodiments, the protruding surface 167 imparts a pressing force that pushes or presses against the inner surface 168, which, in turn, pushes or presses the inner surface 168 against an outer surface of the first support member 102. In various implementations, the magnitude of the pressing force is sufficient to support the shelf 103 at the desired location along and/or around the first support member 102 under a maximum load.

In certain embodiments, the lever 164 can be moved to the open position by pulling or rotating it generally in the direction of an arrow A (e.g., in a direction generally away from the first support member 102). This can result in the cam 165 rotating in a counter-clockwise direction (as viewed in FIG. 10) and moving away from the inner surface 168 and/or outer surface of the first support member 102. In some variants, the first portion is moved into juxtaposition with the outer surface of the first support member 102. When the cam 165 (e.g., lever 164) moves away from the inner surface 168 and/or outer surface of the first support member 102, the pressing force (e.g., radially inward force, compression, etc.) can be reduced and/or eliminated. For example, the pressing force can be reduced when the second portion of the cam 165 moves out of juxtaposition with the outer surface of the first support member 102 and/or the protruding surface 167 disengages (e.g., moves out of contact with) the outer surface of the first support member 102. The reduction and/or elimination of the pressing force can remove the securement of the shelf 103, which can allow the shelf 103 to be adjusted vertically and/or rotatably. In some embodiments, when the lever 164 is in the open position, the first portion having the radius R1 is juxtaposed with the outer surface of the first support member 102 and/or the protruding surface 167 is disengaged (e.g., not in contact) with the inner surface 168 and/or the pressing force is decreased between the cam 165 and the outer surface of the first support member 102. This can enable the shelf 103 to be adjusted relative to the second support member 102, such as vertically and/or rotatably.

Some embodiments include features to facilitate secure engagement between the clamping mechanism 162 and the first support member 102. For example, the clamping mechanism 162 can include a resilient member 169. As shown in FIG. 10, the resilient member 169 can be positioned on (e.g., abutted with) the outer surface of the first support member 102, such as on a side opposite the side the lever 164 is positioned on. In some variants, the resilient member 169 is positioned between the outer surface of the first support member 102 and an inner surface of the clamp body 166. The resilient or flexible material 169 may provide flex and/or increase friction between the clamping mechanism 162 and the first support member 102, such as in response to actuation or moving of the lever 164 and the cam 165. The resilient member 169 can be made of various resilient and/or flexible materials, such as rubber, rubber-like material, silicone-based material, plastic, or otherwise. In some embodiments, the resilient member 169 is formed (e.g., co-molded) with a portion of the clamp body 166.

Certain Additional Embodiments

FIGS. 11-14 illustrate another example embodiment of a shower caddy 200. The shower caddy 200 can resemble or be identical to the shower caddy 100 discussed above in many respects. Accordingly, numerals used to identify features of the shower caddy 100 are incremented by a factor of one hundred to identify like features of the shower caddy 200. For example, like the shower caddy 100 that can include first and second support members 102, 104, the shower caddy 200 can include first and second support members 202, 204. Likewise, the shower caddy 200 can include a shroud 207, which can include any of the features and operate in any of the ways described above in connection with the shroud 107. Any component or step disclosed in any embodiment in this disclosure can be used in any other embodiment.

The second support member 204 can be configured to anchor the shower caddy 200 in a location. For example, the upper and lower ends of the second support member 204 can be anchored against upper and lower stationary objects, such as a ceiling and a floor in a shower and/or a ceiling and a corner of a bathtub. The anchoring can occur with sufficient force to secure the shower caddy 200 in a desired position.

The second support member 204 can be in the form of an elongate member, such as a pole, shaft, rod, or otherwise. In some embodiments, the second support member 204 can be configured to telescope. For example, the second support member 204 can have an upper part that includes first and second portions, which can be configured to slide relative each other.

Figure 11:
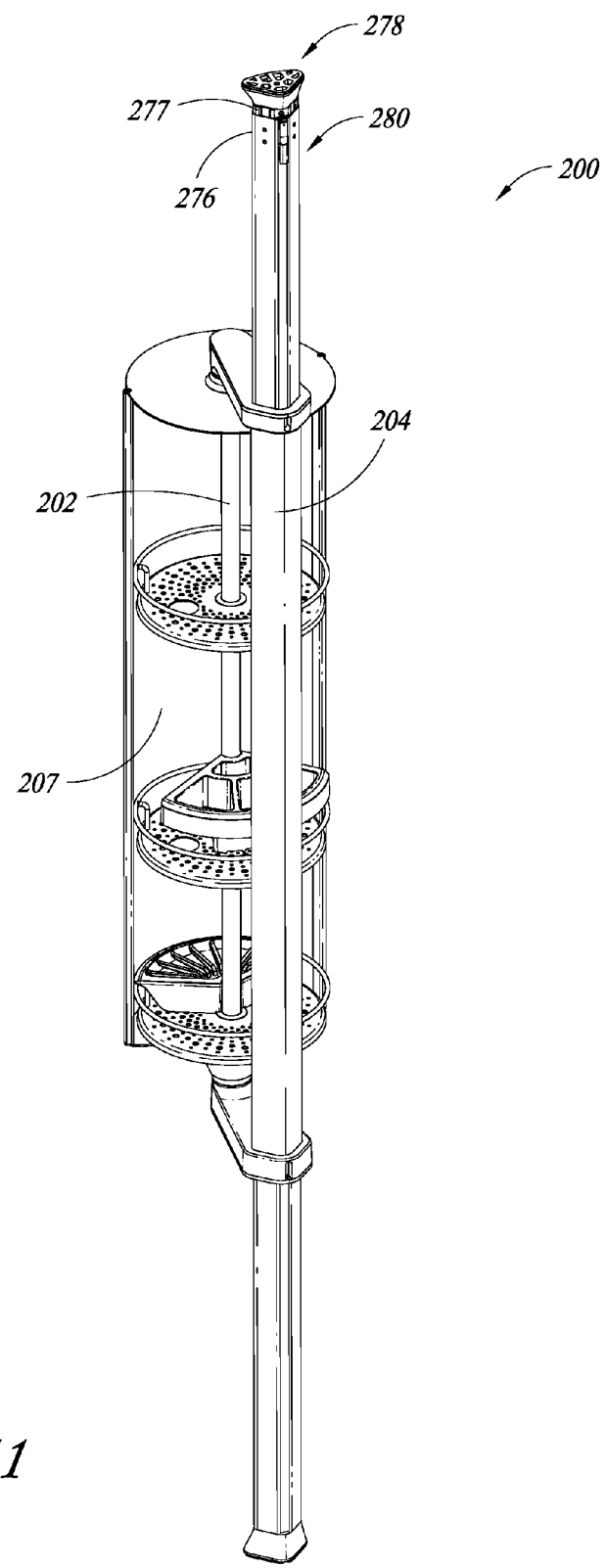
FIG. 11 illustrates a rear perspective view of another embodiment of a shower caddy.
Figure 11A:
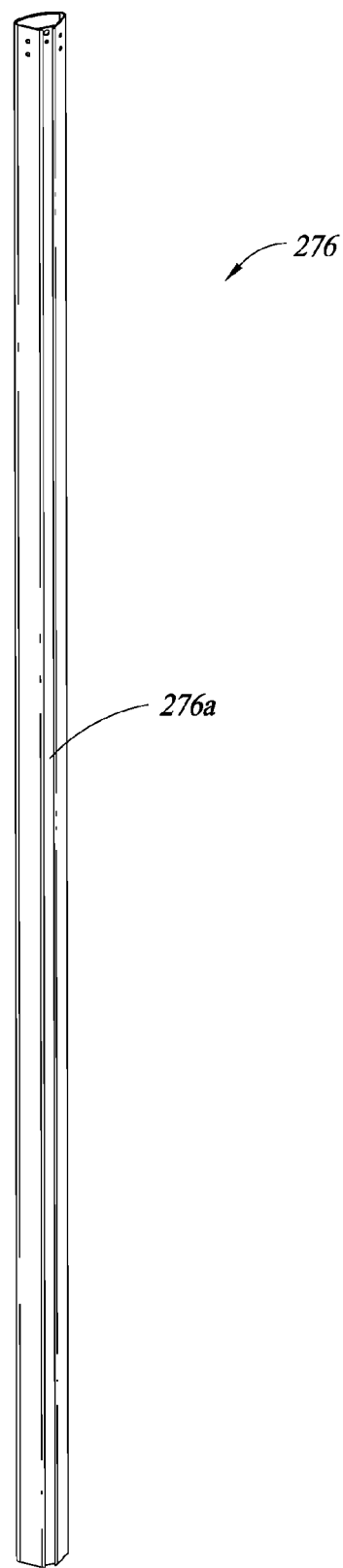
FIGS. 11A, 11B, and 11C respectively illustrate perspective views of an outer tube, inner tube, and foot unit of the shower caddy of FIG. 11.
Figure 11B:
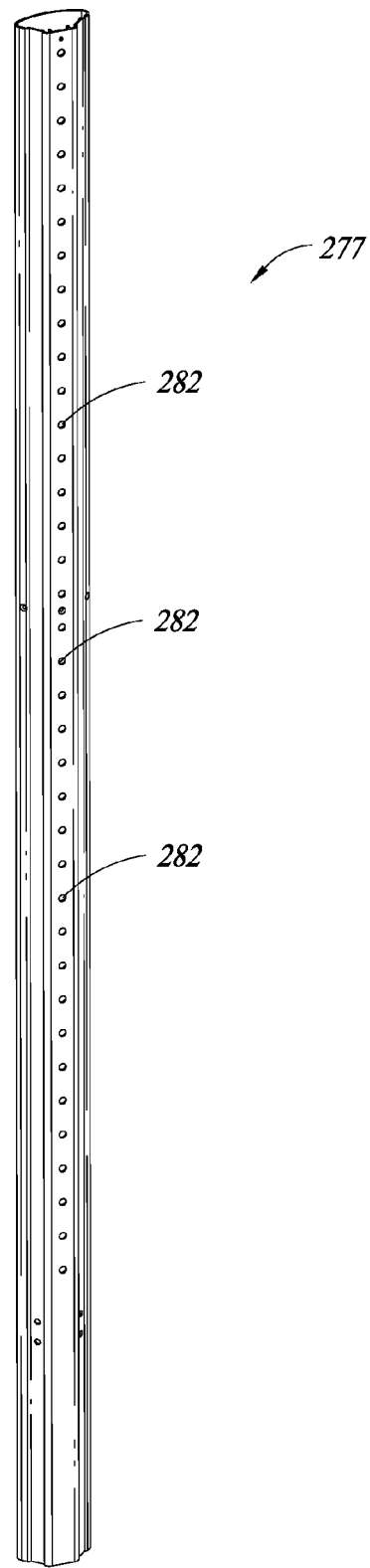
Figure 11C:
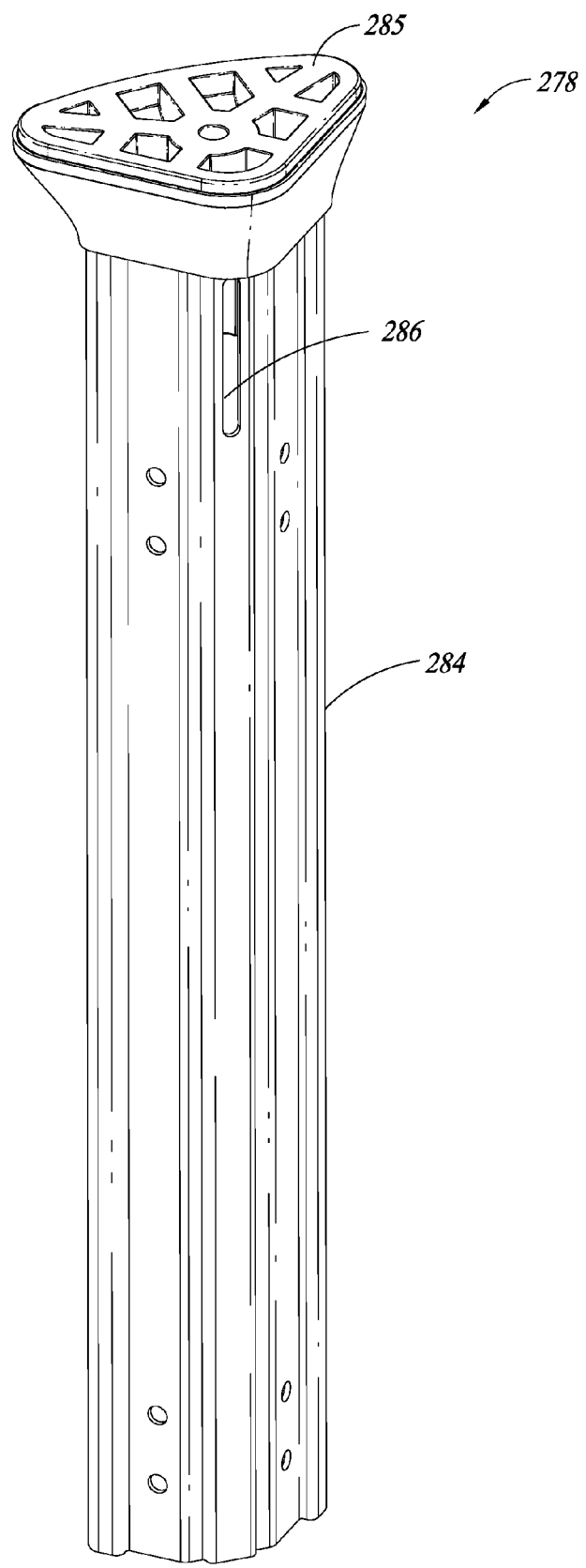

In some embodiments, the shower caddy 200 includes a first and/or a second mechanism that are configured to adjustment the length of the second support member 204. As described in more detail below, the first mechanism can include an outer tube 276 (see FIG. 11A) and an inner tube 277 (see FIG. 11B). In certain implementations, the outer tube includes a longitudinal channel 276a. In some embodiments, the tube 276 has a generally constant cross-sectional shape along its length. This can aid in manufacturing the tube, such as by an extrusion process. For example, the tube 276 can be formed of extruded aluminum. The second mechanism can include a foot unit 278 (see FIG. 11C) and a biasing member 279. In some implementations, the first mechanism acts as a coarse and/or first length adjustment feature and the second mechanism acts as a fine and/or second length adjustment feature. For example, the second mechanism can be intended for use after the first mechanism has been used.

Figure 12:
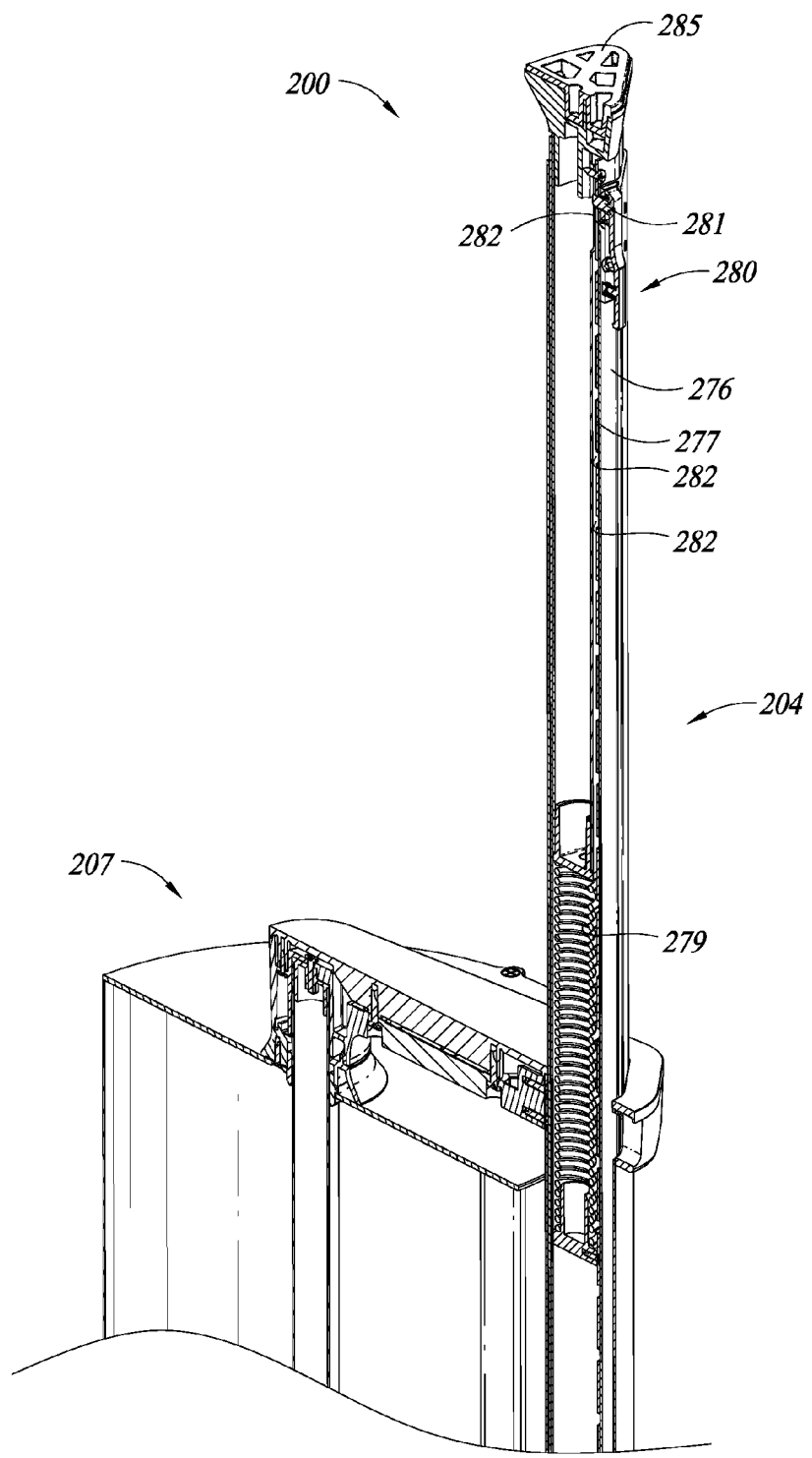
FIG. 12 illustrates a partial rear cross-sectional view of the shower caddy of FIG. 11.
Figure 13:
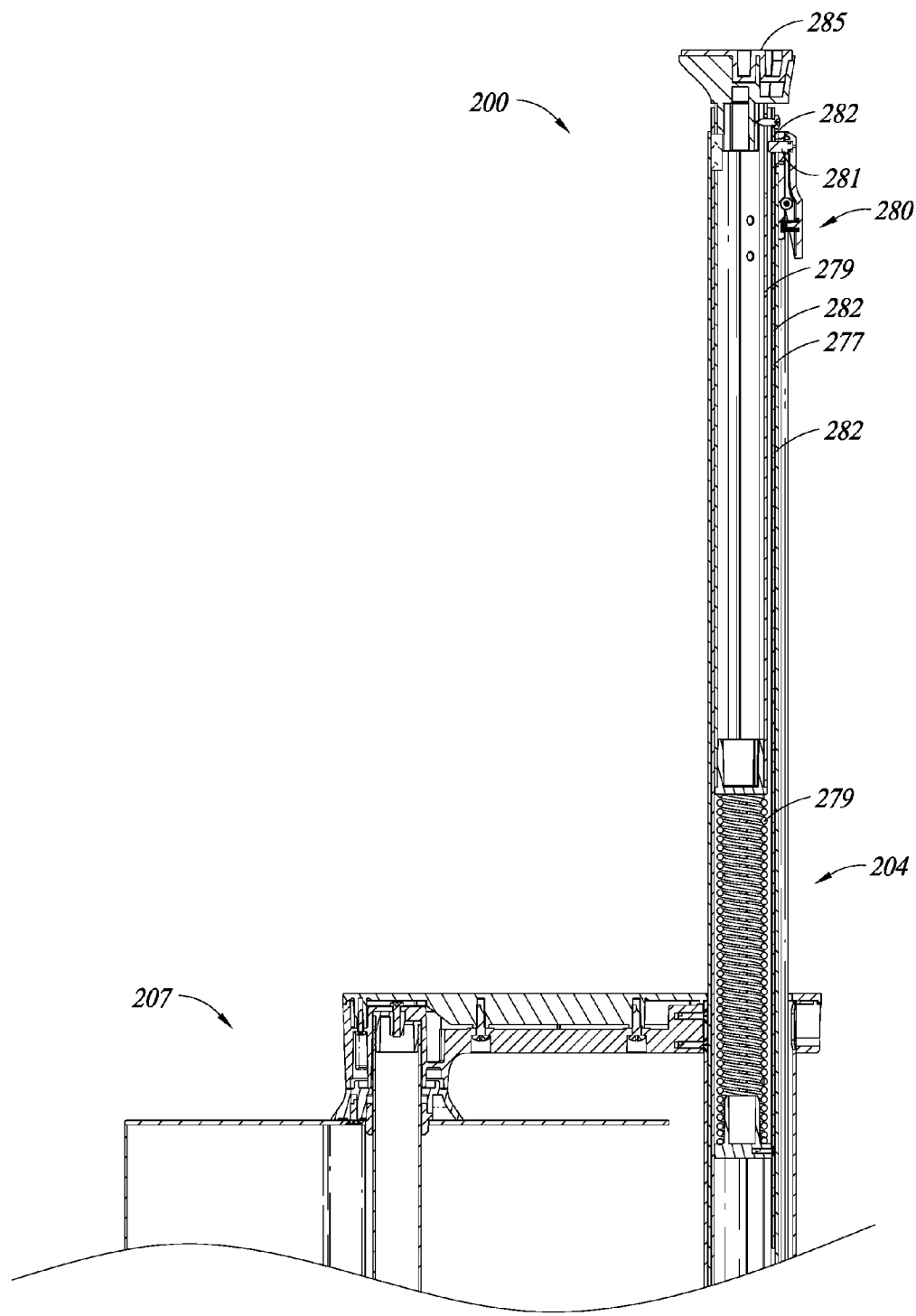
FIG. 13 illustrates a partial side cross-sectional view of the shower caddy of FIG. 11, including a locking mechanism.

A shown in FIGS. 12 and 13, the first mechanism can include a locking mechanism 280. The locking mechanism 280 can be configured to selectively secure the outer and inner tubes 276, 277. In some embodiments, the locking mechanism 280 includes a frictional clamp or a physical interference. For example, as illustrated, the locking mechanism 280 can include an engagement member 281 (e.g., a pin, latch, or the like) that can be received in one of plurality of engagement locations 282 (e.g., a hole, recess, or the like). The locking mechanism 280 can couple the outer and inner tubes 276, 277 so that they move as a unit, and/or can inhibit or prevent relative movement of the outer and inner tubes 276, 277. In certain implementations, the locking mechanism 280 can be inserted into top of the channel 276a, such being slid into and along a portion of the channel 276a.

The locking mechanism 280 can include an actuator 283, such as a lever, button, or otherwise. In the embodiment illustrated in FIG. 14, an end of the actuator 283 can be depressed toward the outer tube 276, which can rotate the actuator 283 about an axis A in the direction R and move the opposite end of the actuator 283 away from the outer tube 276. This can remove the pin 281 from the hole 282, thereby allowing the outer and inner tubes 276, 277 to move relative to each other, such as to increase or decrease the length of the second support member 204. In some implementations, the inner tube 277 slides linearly relative to the outer tube 276. In certain variants, the inner tube 277 does not rotate with respect to the outer tube 276.

Figure 14:
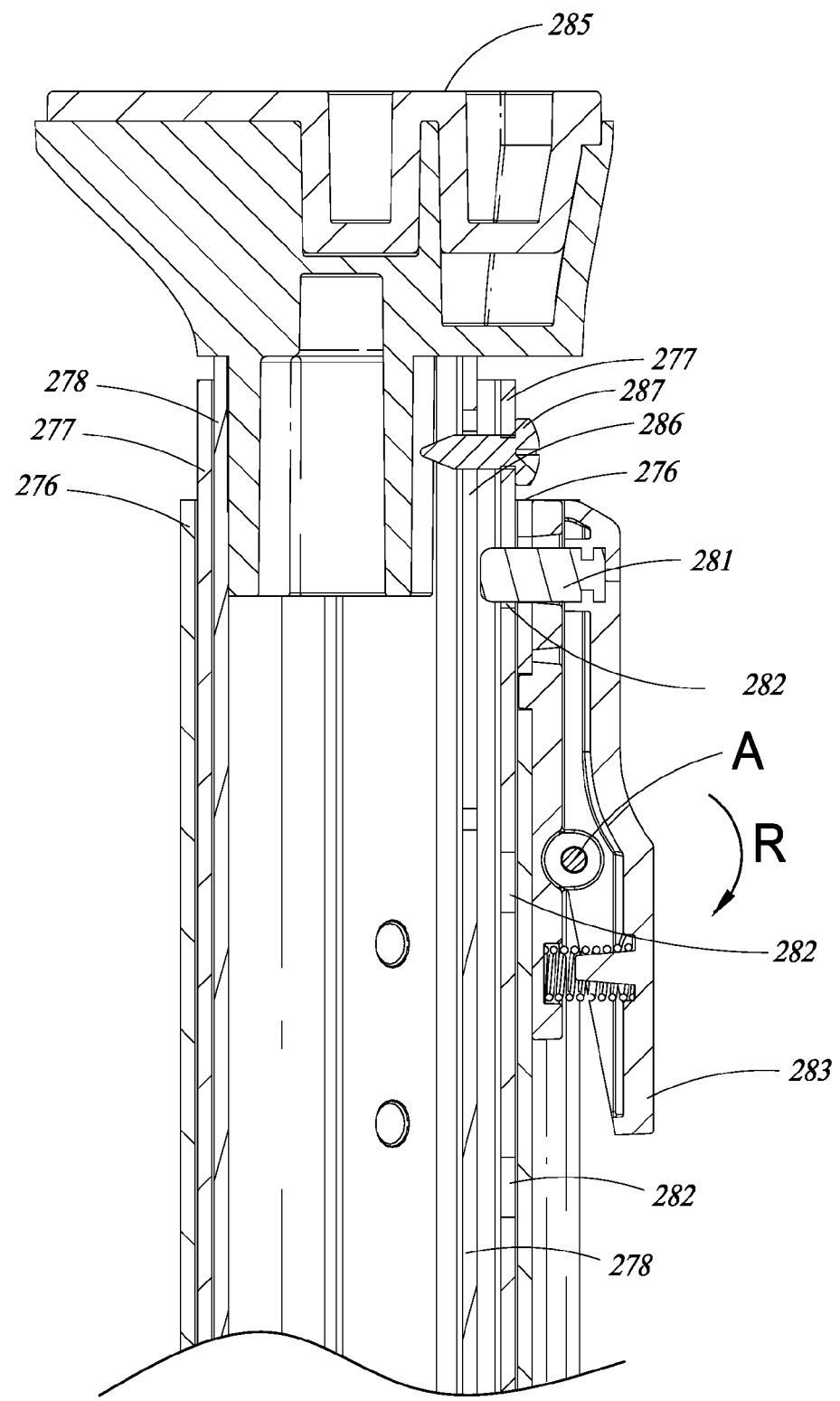
FIG. 14 illustrates a close-up view of the locking mechanism of FIG. 13.

As mentioned above, the shower caddy 200 can include a second mechanism that is configured to adjustment the length of the second support member 204. The second mechanism can include a foot unit 278, which can include a body 284 and a foot 285 that abuts against a support surface. As shown, the foot unit 278 can be received in the inner tube 277. For example, the foot unit 278 can be slidingly received in the inner tube 277. In certain variants, the foot unit 278 does not rotate with respect to the outer tube 276 and/or the inner tube 277. In some embodiments, the foot unit 281 can be configured to control and/or limit movement of the foot unit 278 relative to the inner and/or outer tube 276, 277. For example, the foot unit 281 can include an elongate slot 286 that engages with (e.g., receives) an engagement member 287, such as a screw as illustrated in FIG. 14. When the foot unit 278 slides in the inner tube 277, the engagement member 87 can slide in the slot 286. The ends of the slot 286 can limit the movement of the engagement member 287, thereby limiting the extent to which the foot unit 278 can slide in and/or out of the inner tube 277. In certain implementations, the engagement member remains stationary relative to the inner and/or outer tube 276, 277, such as being located in a threaded hole.

The foot unit 278 can be biased by the biasing member 279 (e.g., a spring). For example, an end of the foot unit 278 can be engaged against the biasing member 279, which can be positioned in an internal cavity of the inner tube 277, as shown in FIGS. 12 and 13. This can enable the biasing member 279 to bias the foot unit 278 in a direction that tends to try to push the foot unit 278 out of the inner tube 277. In some embodiments, in response to sliding movement of the foot unit 278 into the inner tube 277, the biasing member 279 can apply an increasing biasing force to the foot unit 278. This can aid in anchoring the shower caddy 200 in place when installed. In some variants, in response to sliding movement of the foot unit 278 out the inner tube 277, the biasing force on the foot unit 278 can decrease. In some embodiments, the amount that the biasing force can move the foot unit 278 out of the inner tube 277 is limited, such as because of the engagement between the slot 286 in the foot unit 278 and the engagement member 287 (e.g., a screw). The engagement can provide a physical interference that can inhibit or prevent the biasing member 279 from pushing the foot unit 278 substantially completely or completely out of the inner tube 277.

Certain Installation Methods

Figure 15:
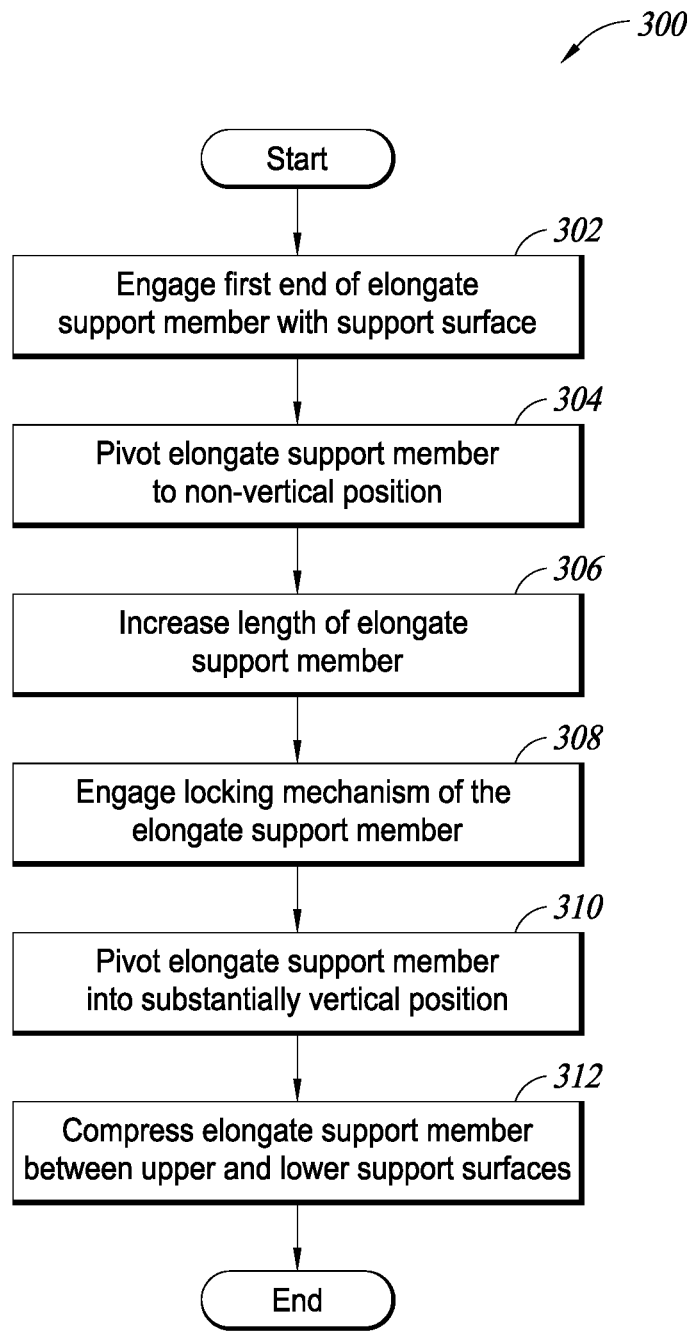
FIG. 15 schematically illustrates a method of installing a shower caddy.

FIG. 15 schematically illustrates an example method 300 of installing a shower caddy, such as any of the shower caddies described above. As previously mentioned, and as described in more detail below, the shower caddy can be installed between a first support surface and a second support surface, such as a floor and ceiling in a shower. The shower caddy can be configured to traverse a vertical distance between the first and second support surfaces. For example, the shower caddy can be configured to traverse a vertical distance that is less than or equal to about 6 feet and/or greater than or equal to about 9 feet. In certain implementations, the method 300 includes determining and/or estimating the vertical distance between the first and second support surfaces.

In some embodiments, the method 300 includes Obtaining a shower caddy. The shower caddy can include any one, or any combination, of the features described or shown in this disclosure. For example, the shower caddy can include an elongate support member.

As shown in FIG. 15, the method 300 can include engaging a first end of the elongate support member against the first support surface 302. This can include, for example, engaging the lower end of the shower caddy with the floor of a shower or the shoulder of a bathtub.

In some implementations, the method 300 includes pivoting the elongate support member about the first end 304. For example, the user can maintain the lower end on the floor of the shower and can pivot the upper end upward. In certain variants, the method 300 includes pivoting the shower caddy about the first end to a position in which the elongate member is non-parallel with vertical. For example, the shower caddy can be offset from vertical at least about: 10°, 15°, 20°, 25°, 30°, 40°, values between the aforementioned values, or other values. In some variants, the method includes pivoting the elongate support member about the first end until the second end is adjacent to the second support surface, yet the elongate member is still non-parallel with vertical.

The method 300 can include disengaging a locking mechanism. This can result in the locking mechanism no longer substantially rigidly coupling an inner tube of the elongate support member with an outer tube of the elongate support member. In some embodiments, the locking mechanism is disengaged by actuating a lever or bottom. In certain variants, disengaging the locking mechanism includes removing a physical interference between the inner and outer tubes, such as by removing a pin, latch, or the like from a hole, recess, or the like in the inner tube and/or outer tube.

Some implementations of the method 300 include moving (e.g., sliding) the inner tube and outer tube relative to each other. In some embodiments, a portion of the inner tube is slid out of the outer tube. In certain variants, the portion of the inner tube is extended out of the outer tube without requiring a user to rotate the inner and/or outer tube.

The method 300 can include increasing the length of the elongate support member to an extended length 306. In some variants, the extended length is greater than the vertical distance between the first surface and the second surface. In certain embodiments, the ratio of the extended length to the vertical distance is at least about: 1.001, 1.005, 1.01, 1.05, 1.1, values between the aforementioned values, or other values.

In certain implementations, the method 300 includes engaging the locking mechanism 308. For example, the method 300 can include engaging a physical interference between the inner and outer tubes, such as by inserting a pin, latch, or the like into a hole, recess, or the like in the inner tube and/or outer tube. In some embodiments, the method 300 includes coupling (e.g., substantially rigidly) the inner tube and the outer tube.

The method 300 can include pivoting the elongate support member 310, such as pivoting the elongate support member about the first end. In certain variants, the elongate support member can be pivoted into a position in which the elongate member is generally parallel with vertical. In some embodiments, the elongate support member can be pivoted into a final installed position, such as into a desired installed position in the shower. In some embodiments, during pivoting of the elongate support member, an end of a foot unit of the elongate support member slides over the first or second support surface.

In some embodiments, the method 300 includes compressing the elongate support member 312. For example, the elongate support member can be moved into an installed position by compressing the elongate support member between the first support surface and the second support surface. In certain variants, the compression can result in movement of the foot unit (e.g., relative to the inner tube and/or outer tube). In some embodiments, the compression is against the bias of a biasing member, such as a spring. The compression of the elongate support member can result in the elongate support member applying an anchoring force on the first and/or second support surfaces, which can aid in maintaining the shower caddy in position.

In certain implementations, the method 300 includes decreasing the length of the elongate support member from the extended length. In some embodiments, such a decrease in length occurs in response to the compression. In some implementations, the length of the elongate support is decreased to about equal to the vertical distance between the first surface support and the second support surface. In some embodiments, the decrease in the length of the elongate support member is accomplished by a portion of the foot unit sliding into the inner tube and/or a portion of the inner tube sliding into the outer tube. In certain variants, decreasing the length of the elongate support member is accomplished without requiring a user to rotate the foot unit, inner tube, and/or outer tube.

Certain Terminology

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

SUMMARY

Although the shelving systems have been disclosed in the context of certain embodiments and examples, the shelving systems extend beyond the specifically disclosed embodiments to other alternative embodiments and/or uses of the embodiments and certain modifications and equivalents thereof. For example, although the illustrated embodiment of the shower caddy 100 has three shelves 103, the shower caddy 100 may have only one shelf, two shelves, more than three shelves, or as many shelves as will fit on the shelf assembly 101 (e.g., on first support member 102). Further, although the shower caddy 100 in the illustrated embodiment has shelves 103 having certain configurations (e.g., generally circular in shape), the shelves 103 may have different configurations, such as being generally square, rectangular, wedge-shaped, or otherwise. Also, although the illustrated embodiment has the first support member 102 extending through a center region of the shelf 103, the first support member 102 may extend through the shelf 103 in an off-center position (e.g., more proximate to a side, front, and/or back edge of the shelf 103). Further, although various embodiments are discussed in connection with installing the shower caddy in a vertical orientation, this disclosure also includes embodiments in which the shower caddy is installed horizontally, such as between generally vertical walls. Various features and aspects of the disclosed embodiments can be combined with or substituted for one another in order to form varying modes of the conveyor. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of shelving systems have been disclosed. Although the shelving systems have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described above, but should be determined only by a fair reading of the claims that follow.

The following is claimed:

1. A shower caddy comprising:
   an elongate support member configured to be secured between a first support surface and a second support surface of a shower, the elongate support member comprising:
   a first end configured to engage with the first support surface;
   a second end configured to engage with the second support surface;
   a first length adjustment mechanism comprising:
   an inner tube;
   an outer tube;
   a locking mechanism configured to:
   engage to couple the inner and outer tubes such that the inner and outer tubes move together as a unit; and
   to disengage to decouple the inner and outer tubes such that the inner and outer tubes move relative to each other;
   a second length adjustment mechanism comprising a foot unit that is configured to move relative to the first length adjustment mechanism;
   a shelving assembly connected with the elongate support member, the shelving assembly comprising:
   a shelf support member comprising an elongate tube with a longitudinal axis, the shelf support member being generally parallel with and spaced apart from the elongate support member;
   a shelf connected with the shelf support member, the shelf being configured to hold bathing articles; and
   a shroud configured to rotate relative to the shelf and about the longitudinal axis of the shelf support member between an open position and a closed position, wherein:
   in the open position, the shroud is configured to allow access to the articles on the shelf; and
   in the closed position, the shroud circumferentially extends around a portion of the shelf and substantially blocks the view of the articles on the shelf.

2. The shower caddy of claim 1, wherein the locking mechanism comprises a pin that is configured to engage into one of a plurality of holes in at least one of the inner tube and the outer tube.

3. The shower caddy of claim 2, wherein the plurality of holes and the shelf support member are positioned on opposite sides of the elongate support member.

4. The shower caddy of claim 2, wherein the locking mechanism further comprises a lever configured to be actuated by a user to move the pin in and out of engagement with the hole.

5. The shower caddy of claim 1, wherein a portion of the foot unit is slidingly received in the inner tube.

6. The shower caddy of claim 1, wherein the second length adjustment mechanism further comprises a spring that biases the foot unit.

7. The shower caddy of claim 1, wherein the inner and outer tubes are not configured to rotate relative to each other.

8. The shower caddy of claim 1, wherein, in the installed position, the locking mechanism is on an upper portion of the shower caddy and a lowermost portion of the locking mechanism is at an elevation that is above the shelf.

9. The shower caddy of claim 1, further comprising a second locking mechanism, wherein:

when the second locking mechanism is engaged, the shelving assembly is not slideable along the elongate support member; and when the second locking mechanism is disengaged, the shelving assembly is slideable along the elongate support member.

10. The shower caddy of claim 9, wherein the shelving assembly is connected with the elongate support member by an arm.

11. The shower caddy of claim 10, wherein the elongate support member is received in an aperture of the arm.

12. A method of installing a shower caddy between a first support surface and a second support surface, the first support surface and the second support surface being a vertical distance apart, the method comprising:
engaging a first end of an elongate support member of the shower caddy against the first support surface;
pivoting the elongate support member about the first end, such that the elongate member is non-parallel with vertical;
disengaging a locking mechanism from substantially rigidly coupling an inner tube of the elongate support member with an outer tube of the elongate support member;
sliding the inner tube relative to the outer tube;
increasing the length of the elongate support member to an extended length, the extended length being greater than the vertical distance between the first surface and the second surface;
with a second end of the elongate support member adjacent the second support surface, engaging the locking mechanism to substantially rigidly couple the inner tube and the outer tube;
pivoting the elongate support member about the first end such that the elongate member is generally parallel with vertical; and
compressing the elongate support member between the first support surface and the second support surface such that the length of the elongate support member is about equal to the vertical distance between the first surface support and the second support surface.

13. The method of claim 12, wherein disengaging the locking mechanism comprises removing a pin from a hole in at least one of the inner and outer tubes.

14. The method of claim 12, wherein engaging the locking mechanism comprises inserting a pin into a hole in at least one of the inner and outer tubes.

15. The method of claim 12, wherein compressing the elongate support member comprises compressing a spring within the elongate support member.

16. The method of claim 12, wherein compressing the elongate support member comprises sliding a foot unit of the second end of the elongate member relative to the inner and outer tubes.

17. The method of claim 12, wherein the first support surface is lower than the second support surface.

18. The method of claim 12, wherein pivoting the elongate support member about the first end comprises pivoting the elongate support member until the second end is adjacent to the second support surface.

19. The method of claim 12, further comprising sliding a second end of the elongate support along the second support surface.

20. The method of claim 12, further comprising estimating an approximate length of the vertical distance.

21. A shower caddy comprising:
an elongate support member comprising a first end and a second end, and a longitudinal axis extending between the first and second ends, the first end configured to engage with a first support surface of the shower, the second end configured to engage with a second support surface of the shower;
a shelf assembly attached to the elongate support member, the shelf assembly comprising:
a shelf for holding bathroom articles; and
a shroud that extends around at least 45° of a perimeter of the shelf, the shroud configured to rotate between a first position and a second position, wherein:
the first position corresponds to a closed position in which the shroud surrounds a first circumferential portion of the shelf and blocks view of the articles positioned on the shelf;
the second position corresponds to an open position in which the shroud is configured to allow access to the articles on the shelf; and
a biasing assembly configured to bias the shroud toward the open position or the closed position such that, in response to a user rotating the shroud partly toward the open position or the closed position, the biasing assembly automatically rotates the shroud the remainder of the way to the open position or the closed position.

22. The shower caddy of claim 21, wherein the shroud rotates about an axis that is generally parallel to the longitudinal axis of the elongate support member.

23. The shower caddy of claim 21, wherein the shelf assembly further comprises a tubular support member, the tubular support member being generally parallel with the elongate support member.

24. The shower caddy of claim 21, wherein the elongate support member further comprises:
a first length adjustment mechanism that comprises an inner tube, an outer tube, and a locking mechanism, the locking mechanism being configured to:
engage to couple the inner and outer tubes such that the inner and outer tubes move together as a unit; and
to disengage to decouple the inner and outer tubes such that the inner and outer tubes move relative to each other; and
a second length adjustment mechanism that comprises a foot unit, the foot unit being configured to move relative to the first length adjustment mechanism.

25. The shower caddy of claim 21, wherein the shelf is configured to rotate relative to the elongate support member around an axis of rotation that is spaced apart from the longitudinal axis of the elongate support member.

26. The shower caddy of claim 21, wherein the shroud is configured to rotate relative to the elongate support member around an axis of rotation that is spaced apart from the longitudinal axis of the elongate support member.

27. The shower caddy of claim 21, wherein the shelf is configured to slide relative to the shroud and the elongate support member.

28. The shower caddy of claim 21, wherein the elongate support member comprises a tubular member.

29. The shower caddy of claim 1, wherein the shroud extends around at least 45° of the circumference of the shelf.

30. The shower caddy of claim 1, wherein the shelf is connected with the elongate tube.

31. The shower caddy of claim 1, wherein the shelf is movable along the elongate tube.

32. The shower caddy of claim 1, wherein the shelf further comprises a latch, wherein in a secured state of the latch the shelf is fixedly secured to the elongate tube and in a released state of the latch the shelf can be moved along the elongate tube.

33. The method claim 12, wherein pivoting the elongate support member about the first end such that the elongate member is non-parallel with vertical further comprises positioning the second end of the elongate support member adjacent the second support surface.

* * * * *

UNITED STATES PATENT AND TRADEMARK OFFICE
CERTIFICATE OF CORRECTION

PATENT NO.       : 9,943,192 B2
APPLICATION NO.  : 15/060057
DATED            : April 17, 2018
INVENTOR(S)      : Frank Yang It is certified that error appears in the above-identified patent and that said Letters Patent is hereby corrected as shown below:

In Column 2 at Line 67, change "following, in" to --following. In--.

In Column 4 at Line 60, change "Obscure" to --obscure--.

In Column 5 at Line 24, change "Obscure" to --obscure--.

In Column 8 at Line 64, change "Observed" to --observed--.

In Column 9 at Line 1, change "etc." to --etc.) on--.

In Column 9 at Line 11, after "thereon" insert --(e.g.,--.

In Column 10 at Line 42, change "mod/or" to --and/or--.

In Column 12 at Line 19, change "sonic" to --some--.

In Column 17 at Line 34, change "87" to --287--.

In Column 18 at Lines 14-15, change "Obtaining" to --obtaining--.

Signed and Sealed this
Fourth Day of December, 2018

Andrei Iancu
*Director of the United States Patent and Trademark Office*